United States Patent
Lombardi

(10) Patent No.: US 10,466,363 B2
(45) Date of Patent: Nov. 5, 2019

(54) DISCIPLINED CLOCK FOR PROVIDING A DISCIPLINED TIME AND A DISCIPLINED FREQUENCY SYNCHRONOUS WITH A REFERENCE CLOCK

(71) Applicant: GOVERNMENT OF UNITED STATES OF AMERICA, AS REPRESENTED BY THE SECRETARY OF COMMERCE, Washington, DC (US)

(72) Inventor: Michael A. Lombardi, Broomfield, CO (US)

(73) Assignee: GOVERNMENT OF THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 428 days.

(21) Appl. No.: 15/410,080

(22) Filed: Jan. 19, 2017

(65) Prior Publication Data
US 2018/0011199 A1    Jan. 11, 2018

Related U.S. Application Data

(60) Provisional application No. 62/358,279, filed on Jul. 5, 2016.

(51) Int. Cl.
| | |
|---|---|
| *G01S 19/23* | (2010.01) |
| *G01S 19/14* | (2010.01) |
| *G01S 19/21* | (2010.01) |
| *G04R 40/06* | (2013.01) |

(52) U.S. Cl.
CPC ........... *G01S 19/235* (2013.01); *G01S 19/14* (2013.01); *G01S 19/21* (2013.01); *G04R 40/06* (2013.01)

(58) Field of Classification Search
CPC ........ G01S 19/235; G01S 19/21; G01S 19/14; G04R 40/06
See application file for complete search history.

(56) References Cited

U.S. PATENT DOCUMENTS

| | | | | |
|---|---|---|---|---|
| 8,040,276 B2 * | 10/2011 | Vadlamani | ............. | G01S 19/23 |
| | | | | 342/357.62 |
| 2013/0063308 A1 * | 3/2013 | Krasner | ................. | G01S 19/05 |
| | | | | 342/393 |

* cited by examiner

*Primary Examiner* — Jianye Wu
(74) *Attorney, Agent, or Firm* — Office of Chief Counsel for National Institute of Standards and Technology

(57) ABSTRACT

A disciplined clock provides a disciplined time and a disciplined frequency synchronous with a reference clock. The disciplined clock includes: a time receiver to: receive a common view signal from the common view clock; and produce a receiver timing signal; a local clock to: receive a frequency correction; and produce a local timing signal; a time interval counter to: receive the receiver timing signal from the time receiver; receive the local timing signal from the lock clock; and determine a time difference between the receiver timing signal and the local timing signal; and a controller to: receive the time difference from the time interval counter; and communicate the frequency correction, based on the time difference, to the local clock.

27 Claims, 18 Drawing Sheets

| Time Stamp | Reference or Local Time Differences (RTD$_a$ or LTD$_a$), obtained as Clock - GPS Satellite$_a$, in nanoseconds |||||||||||||||||||| 
|---|---|---|---|---|---|---|---|---|---|---|---|---|---|---|---|---|---|---|---|
| UTC hours and minutes (HHMM) | TD1 | TD2 | TD3 | TD4 | TD5 | TD6 | TD7 | TD8 | TD9 | TD10 | TD11 | TD12 | TD13 | TD14 | TD15 | TD16 | TD17 | TD18 | TD19 | TD20 |
| 0010 | . | . | . | . | . | -9.49 | -11.81 | -3.51 | . | . | . | . | . | . | . | . | . | . | -4.22 | . |
| 0020 | . | . | . | . | . | -8.46 | -11.26 | -6.56 | . | . | . | . | . | . | . | . | . | . | . | . |
| 0030 | . | . | -2.5 | . | -7.8 | -8.86 | -8.17 | -6.95 | . | . | . | . | -6.18 | . | . | . | . | . | . | . |
| 0040 | . | . | -4.07 | . | -6.66 | -5.89 | -7.57 | -7.27 | . | . | . | . | -6.93 | . | . | . | . | . | . | . |
| 0050 | 1.08 | . | -2.14 | . | -7.7 | -9.26 | -9.38 | -12.55 | . | . | -0.25 | -4.82 | . | . | . | . | . | . | . | -9.02 |
| 0100 | 4.19 | . | -4 | . | -8 | -5.33 | -11.11 | -9.95 | . | . | -8.11 | -2.97 | . | . | . | . | . | . | . | . |
| 0110 | 14.77 | . | -4.17 | . | -7.51 | -0.37 | -8.37 | -10.96 | . | . | -2.81 | -3.77 | . | . | . | . | . | . | . | -8.07 |
| 0120 | 8.97 | . | -3.46 | . | -6.22 | . | . | -8.24 | -10.32 | . | . | -4.62 | -0.01 | . | . | . | . | . | . | . |
| 0130 | 6.97 | . | -3.1 | . | -7.84 | . | . | -7.46 | -7.12 | . | . | -7.26 | . | -1.83 | . | . | . | . | . | . |
| 0140 | 9.62 | . | -3.17 | . | -8.69 | . | . | -6.68 | -9.68 | . | . | -6.58 | . | -8.18 | . | . | . | . | . | -5.58 |
| 0150 | 9.17 | . | -4.61 | . | -4.63 | . | . | -8.02 | -8.91 | . | . | -9.04 | . | . | . | . | . | . | . | . |
| 0200 | 8.54 | . | -2.51 | . | -6.27 | . | . | -8.44 | -7.78 | . | -4.8 | -7.3 | . | . | . | . | . | . | . | . |
| 0210 | 9.43 | . | -5.97 | . | -5.62 | . | . | -5.72 | -7.48 | . | -0.4 | -5.37 | . | . | . | . | . | . | . | . |
| 0220 | 9.02 | . | -1.98 | . | -3.18 | . | . | -6.82 | -6.3 | . | -0.18 | -6.92 | . | . | . | . | . | . | . | . |
| 0230 | 7.62 | . | -0.88 | . | . | -2.12 | . | . | -6.53 | -7.26 | -3.51 | -4.65 | . | . | . | . | . | . | . | . |

DISCIPLINED CLOCK FOR PROVIDING A DISCIPLINED TIME AND A DISCIPLINED FREQUENCY SYNCHRONOUS WITH A REFERENCE CLOCK

CROSS REFERENCE TO RELATED APPLICATIONS

This application claims the benefit of U.S. Provisional Patent Application Ser. No. 62/358,279, filed Jul. 5, 2016, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a disciplined clock to provide a disciplined time and a disciplined frequency synchronous with a reference clock, the disciplined clock comprising: a time receiver to: receive a common view signal from the common view clock; and produce a receiver timing signal; a local clock to: receive a frequency correction; and produce a local timing signal; a time interval counter to: receive the receiver timing signal from the time receiver; receive the local timing signal from the lock clock; and determine a time difference between the receiver timing signal and the local timing signal; and a controller to: receive the time difference from the time interval counter; and communicate the frequency correction, based on the time difference, to the local clock.

Further disclosed is a process for producing a disciplined time and a disciplined frequency, the process comprising, by the disciplined clock: receiving a common view signal from a common view clock; producing a first receiver timing signal; producing a local timing signal by the local clock from the first receiver timing signal; determining a local time difference between the local timing signal and the first receiver timing signal; communicating the local time difference to a remote timing analyzer; receiving a frequency correction by the controller from the remote timing analyzer, the frequency correction based on a remote time difference between the local time difference and reference time difference from a reference clock; and controlling the local clock by the controller such that the local clock produces the disciplined frequency and the disciplined time, based on the frequency correction.

Also disclosed is a process for producing a disciplined time and a disciplined frequency, the process comprising, by the disciplined clock: receiving a common view signal from a common view clock; producing a first receiver timing signal; producing a local timing signal by the local clock from the first receiver timing signal; determining a local time difference between the local timing signal and the first receiver timing signal; retrieving a reference time difference from a remote timing analyzer, the reference time difference based on a reference time scale from a reference clock; determine a remote time difference from the local time difference and the reference time difference; converting the remote time difference to a frequency correction; and applying the frequency correction to the local clock such that the

2 local clock produces the disciplined frequency and the disciplined time, based on the frequency correction.

BRIEF DESCRIPTION OF THE DRAWINGS

The following descriptions should not be considered limiting in any way. With reference to the accompanying drawings, like elements are numbered alike.

FIG. 8 shows a table that lists time stamps and from a common view clock.

DETAILED DESCRIPTION

Figure 1:
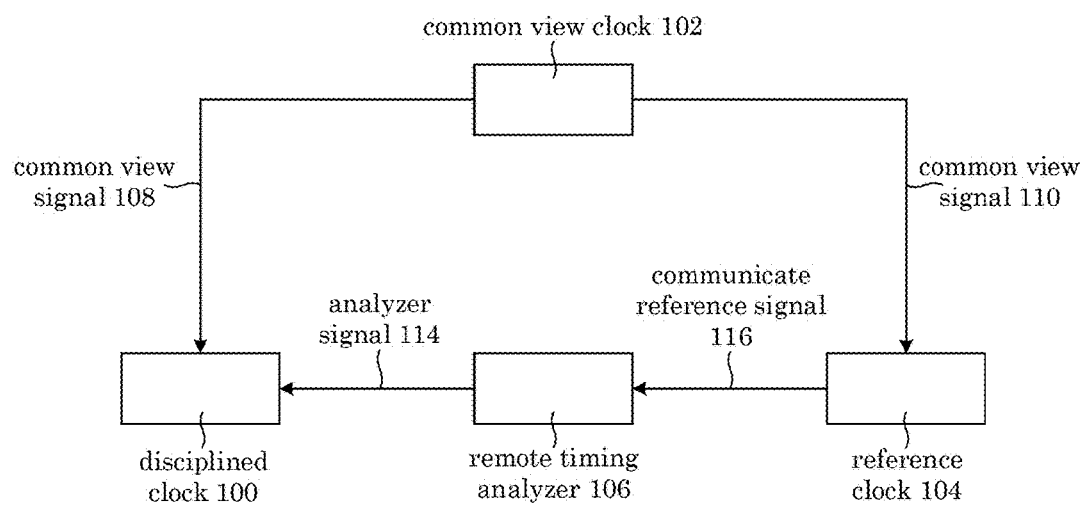
FIG. 1 shows a disciplined clock system.

A detailed description of one or more embodiments is presented herein by way of exemplification and not limitation.

It has been discovered that a disciplined clock herein is a multi-source common-view disciplined clock (MSCVDC) that is a time and frequency article that provides redundant sources of reference time at a very high accuracy (e.g., within 100 nanoseconds of Coordinated Universal Time (UTC)). In an embodiment, the disciplined clock synchronizes and locks its frequency to a reference clock that includes a reference time scale. Locking occurs through common-view observations of a global navigation satellite system (GNSS) satellite by the disciplined clock. The reference clock makes common-view GNSS measurements also and provides data via the Internet. Advantageously, if a particular reference clock is unavailable, the disciplined clock switches automatically to another reference clock. If the Internet connection fails, the disciplined clock maintains synchronization by locking its frequency to the GNSS satellite broadcasts until the Internet connection is restored. In this manner, the disciplined clock unexpectedly provides a redundant, fail-safe source of high accuracy time, e.g., for critical applications.

The disciplined clock uses an external source for a reference time to synchronize the time of an internal clock of the disciplined clock and to control a frequency of an oscillator of the disciplined clock so that the disciplined clock is continuously kept on time. A conventional radio controlled clock (RCC) periodically synchronizes its clock to an external reference source (such as NIST radio station WWVB) but does not control the frequency of the RCC's oscillator. Accordingly, the RCC accumulates a large time error during the interval between synchronizations (which typically is one day). Beneficially, the disciplined clock does not accumulate any significant time error.

An exemplary common view signal for the disciplined clock is an RF signal that originates from a global navigation satellite system (GNSS) such as the United States Global Positioning System (GPS), the Russian Global Navigation Satellite System (GLONASS), or the European Galileo system. These GNSS satellites carry on-board atomic clocks and are excellent sources of time and frequency that provide sub-microsecond accuracy. However, each GNSS system alone is referenced to a specific time scale that may not meet a legal or technical specification for certain applications. For example, GPS is referenced to the UTC scale of the United States Naval Observatory (USNO) in Washington, D.C., known as UTC(USNO). GLONASS time is referenced to Soviet Union time (UTC(SU)), and Galileo time is referenced to a UTC time scale that is overseen by a partnership of five European national metrology institutes that are located in Germany, the United Kingdom, France, Spain, and Belgium.

A time application that may not be satisfied by synchronizing only to GNSS time is time stamping a stock market transaction. Stock market transactions in world financial markets, including the New York Stock Exchange and NASDAQ in the United States, are time stamped to within a given uncertainty of National Institute of Standards and Technology (NIST) time (UTC(NIST) also referred to herein as NIST time) according to the Financial Industry Regulatory Authority (FINRA) OATS Rule 7430. FINRA provides protection of investors and ensures integrity of financial markets. OATS is an order audit trail system established by FINRA in 1998. FINRA OATS rule 7430 requires the use of NIST time, and no GNSS satellite directly provides NIST time.

With regard to directly referencing time only to GNSS time, time error in the satellite broadcast causes loss of synchronization. GNSS synchronization can fail due to jamming caused by RF interference that prevents receiving satellite signals from GNSS satellites or caused by spoofing, which is imitation of a GNSS signal from a false signal that contains incorrect information. Without a redundant source of GNSS time, synchronization loss happens occurs when these failure modes occur.

Advantageously and unexpectedly, the disciplined clock overcomes the problem of not being able to discipline itself to a non-GNSS time scale when necessary to meet an application's requirements. Further, the disciplined clock overcomes the problem of not having multiple sources of time for fail-safe redundancy. Accordingly, the disciplined clock is a multi-source, common-view disciplined clock (MSCVDC) with fail-safe redundancy.

The disciplined clock obtains time synchronization by using common-view for discipline to a reference time scale. Here, the disciplined clock system involves a common-view signal (CVS) that is received where a reference clock having a reference time scale is located and locations where disciplined clocks are located. A plurality of GNSS satellites can provide the CVS. Signals from other sources could be used when they are accessible to the reference clock and the disciplined clock. The CVS provides transfer of time, e.g., a satellite, to the disciplined clock, and a time accuracy of the CVS can be unimportant.

In an embodiment, with reference to FIG. 1, disciplined clock system 200 includes common view clock 102 to provide common view signal 108, disciplined clock 100 in communication with common view clock 102 to receive common view signal 108 from common view clock 102, reference clock 104 to receive common view signal 110 from common view clock 102 and to communicate reference signal 116, and remote timing analyzer 106 in communication with reference clock 104 to receive reference signal 116 from reference clock 104. Remote timing analyzer 106 produces analyzer signal 114 based on reference signal 116 and communicates analyzer signal 114 to disciplined clock 100. Reference signal 116 can include reference time difference RTD, and analyzer signal 114 can include reference time difference RTD, remote time difference RemTD, and the like, or a combination of the RTD and RemTD. In this manner, disciplined clock 100 can produce disciplined frequency 30 or disciplined time 32 based on reference time difference RTD or remote time difference RemTD.

Figure 2:
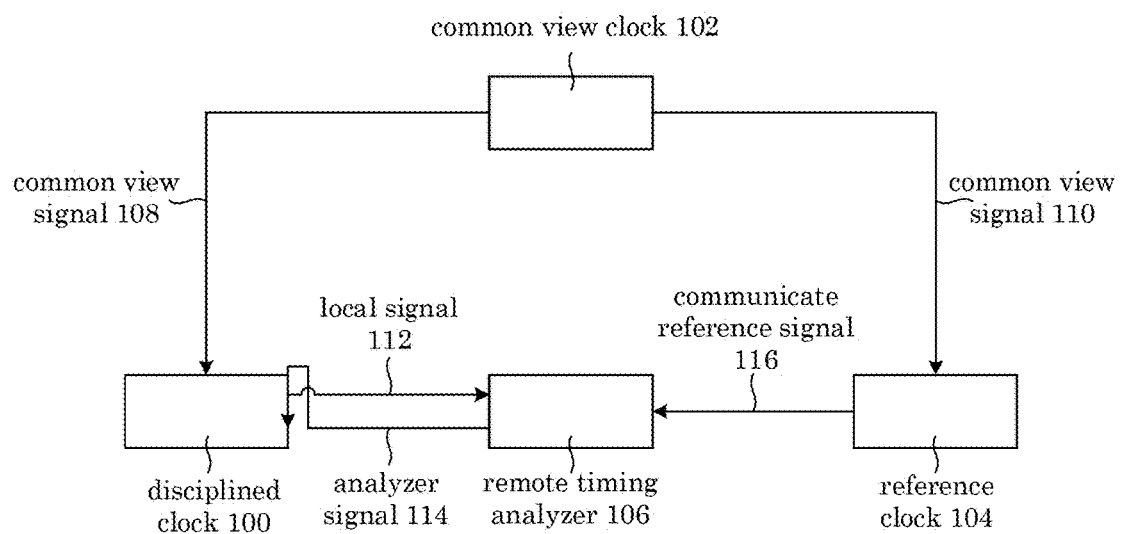
FIG. 2 shows a disciplined clock system.

In an embodiment, with reference to FIG. 2, disciplined clock system 200 includes common view clock 102 to provide common view signal 108, disciplined clock 100 in communication with common view clock 102 to receive common view signal 108 from common view clock 102 and to produce local signal 112 based on common view signal 108, reference clock 104 to receive common view signal 110 from common view clock 102 and to communicate reference signal 116, and remote timing analyzer 106. Here, remote timing analyzer 106 is in communication with reference clock 104 to receive reference signal 116 from reference clock 104 and also is in communication with disciplined clock 100 to receive local signal 112 from disciplined clock 100. Remote timing analyzer 106 produces analyzer signal 114 based on reference signal 116 and local signal 112, wherein remote timing analyzer 106 communicates analyzer signal 114 to disciplined clock 100. Local signal 112 can include local time difference LTD. Reference signal 116 can include reference time difference RTD, and analyzer signal 114 can include reference time difference RTD, remote time difference RemTD, and the like, or a combination of the RTD and RemTD.

Figure 3:
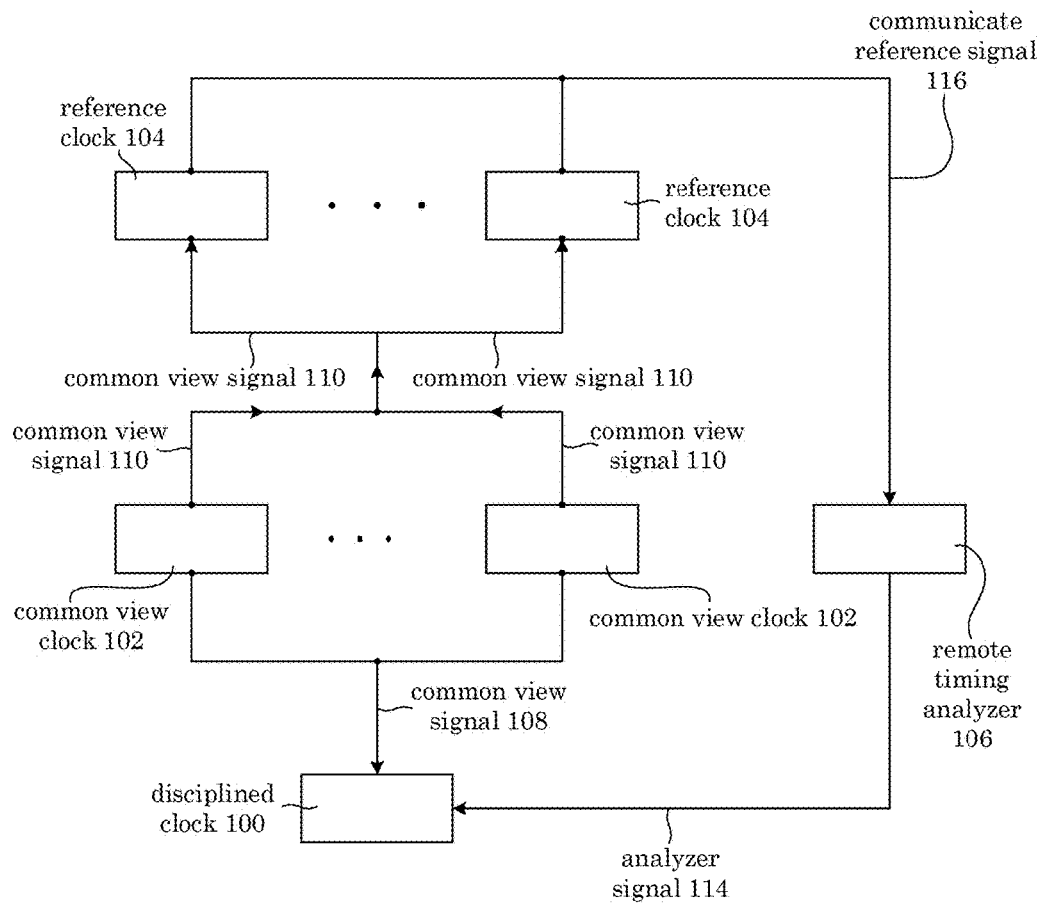
FIG. 3 shows a disciplined clock system.
Figure 4:
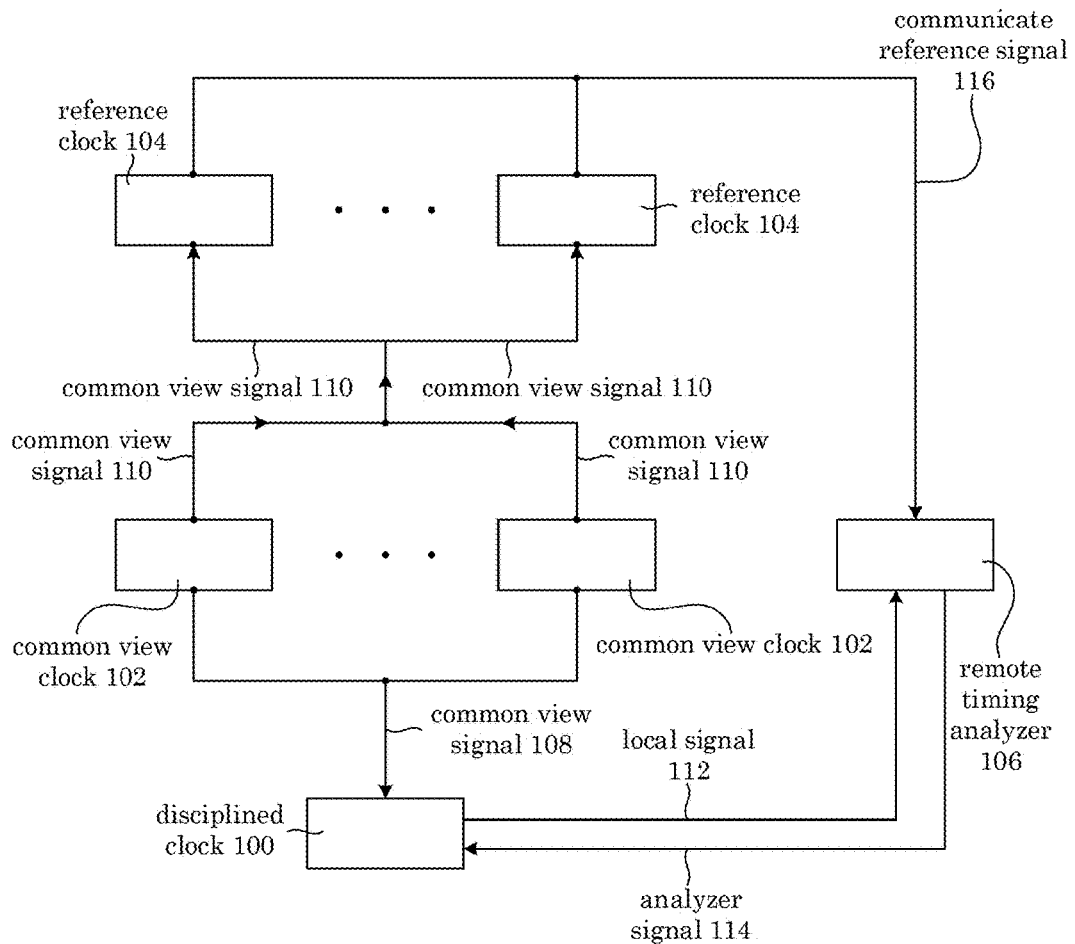
FIG. 4 shows a disciplined clock system.

According to an embodiment, as shown in FIG. 3, disciplined clock system 200 can include a plurality of reference clocks 104 in communication with a plurality of common view clocks 102 and in communication with remote timing analyzer 106. In this manner, disciplined clock 100 can switch between using a particular reference clock 104 or a particular common view clock 102. Moreover, in this configuration, disciplined clock 100 receives analyzer signal 114 from remote timing analyzer 106.

Figure 5:
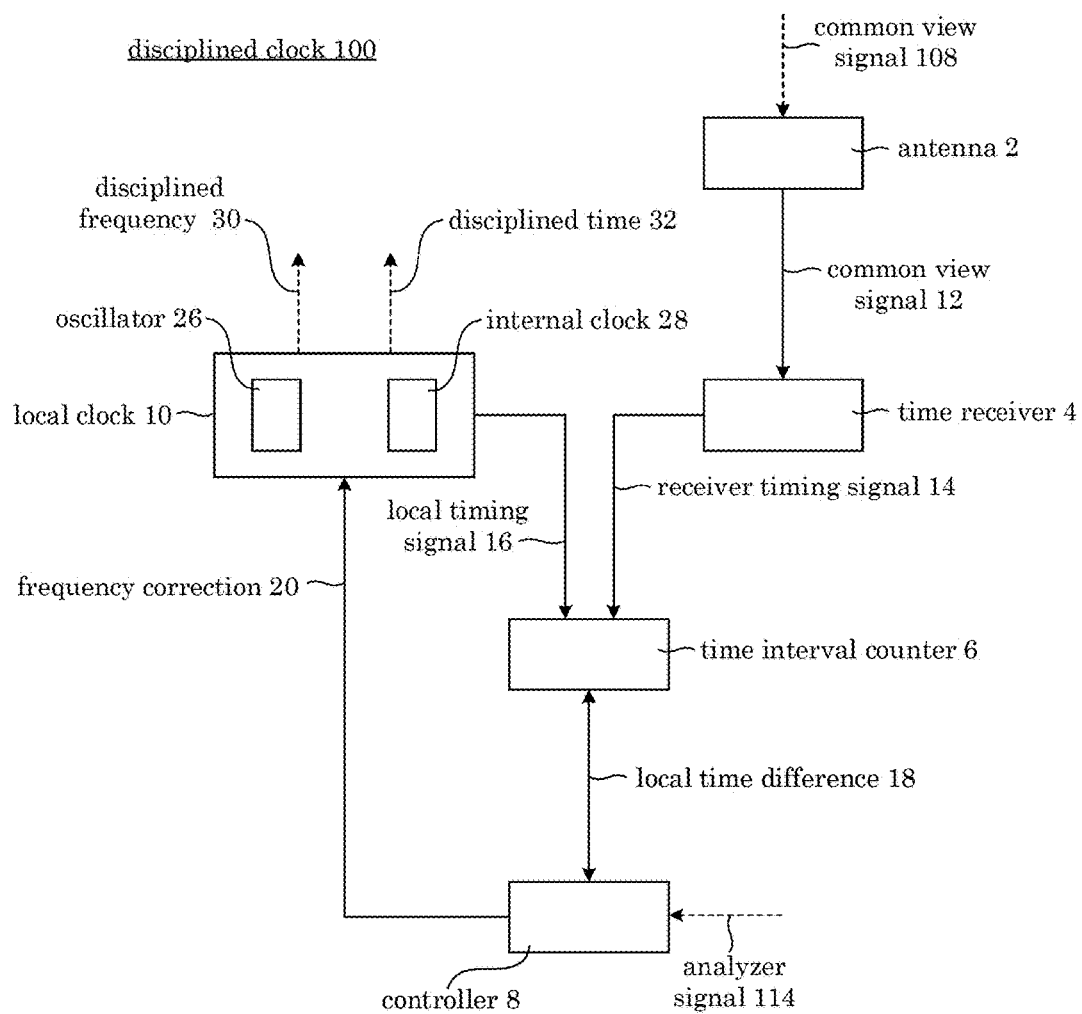
FIG. 5 shows a disciplined clock.

In an embodiment, with reference to FIG. 5, disciplined clock 100 includes controller 8 (e.g., a computer with software), time receiver 4 (e.g., a GNSS satellite receiver), antenna 2, time interval counter 6 (TIC), local clock 10 that includes internal clock 28 and oscillator 26 (e.g., a quartz or rubidium oscillator) with outputs respectively for disciplined time 32 and disciplined frequency 30. Disciplined time 32 includes a 1 pulse per second (pps) timing output. It is contemplated that one timing output of disciplined time 32 from local clock 10 is reserved for continuous measurement, and another timing output of disciplined time 32 from local clock 10 is disciplined to the reference time scale and used as time references for another article, e.g., as a synchronization source for a network time server. The timing delays of time receiver 4, antenna cable that communicates common view signal 12 from antenna 2 to time receiver 4, and antenna 2 can be calibrated and entered into the software before deployment of disciplined clock 100. Controller 8 can include network interface 24 (e.g., a network interface card (NIC)) to access remote timing analyzer 106 or the Internet or a hardware interface (e.g., RS-232, USB, PCI, and the like) to send a frequency correction or time correction to local clock 10 and to control time receiver 4 and time interval counter 6.

In an embodiment, with reference to FIG. 5, disciplined clock 100 provides disciplined time 32 and disciplined frequency 30 synchronous with common view clock 102 and reference clock 104. Here, disciplined clock 100 includes time receiver 4 to receive common view signal 108 from common view clock 102 and to produce receiver timing signal 14. Disciplined clock 100 also includes local clock 10 to receive frequency correction 20 and to produce local timing signal 16. Time interval counter 6 receives receiver timing signal 14 from time receiver 4, receives local timing signal 16 from lock clock 10, and determines time local difference 18 (LTD) between receiver timing signal 14 (RTS) and local timing signal 16 (LTS). Controller 8 receives local time difference 18 from time interval counter 6 and communicates frequency correction 20, based on local time difference 18, to local clock 10.

Figure 6:
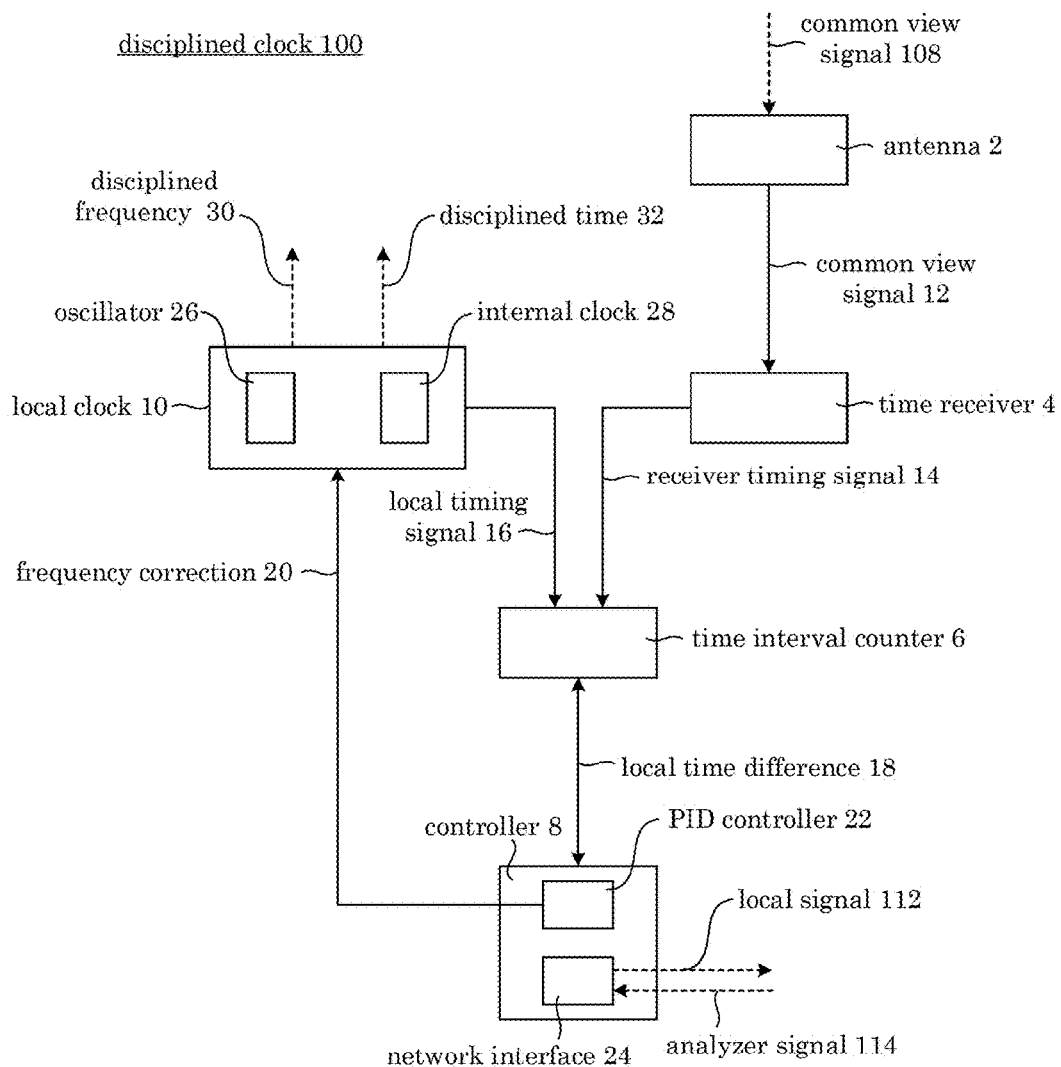
FIG. 6 shows a disciplined clock.

In an embodiment, with reference to FIG. 6, disciplined clock 100 includes network interface 24 to communicate local time difference 18 as local signal 112 to remote timing analyzer 106, receives frequency correction 20 as part of analyzer signal 114 from remote timing analyzer 106, and communicates frequency correction 20 to local clock 10 or other components of controller 8.

In a certain embodiment, disciplined clock 100 controller 8 determines frequency correction 20 based on local time difference 18 in an absence of communication with remote timing analyzer 106.

According to an embodiment, antenna 2 of disciplined clock 100 is in electrical communication with time receiver 4, receives common view signal 108 from common view clock 102 and communicates common view signal 12 to time receiver 4.

In an embodiment, local clock 10 includes oscillator 26 in electrical communication with controller 8, wherein oscillator 26 receives frequency correction 20 and produces disciplined frequency 30. Further, local clock 10 also includes internal clock 28 in electrical communication with time interval counter 6, produces local timing signal 16 (based on disciplined frequency 30 from oscillator 26), communicates local timing signal 16 to time interval counter 6, and produces disciplined time 32, based on disciplined frequency 30 from oscillator 26.

Figure 7:
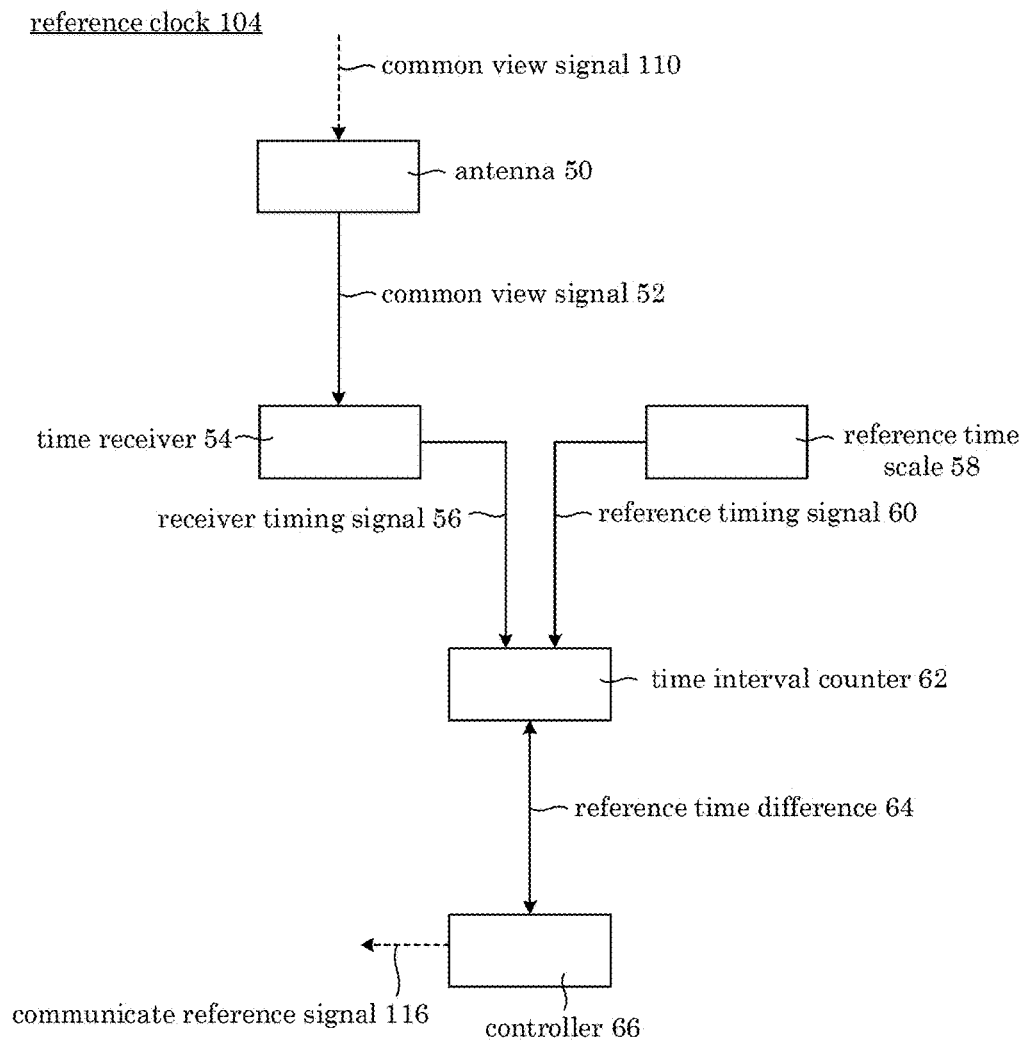
FIG. 7 shows a reference clock.

In disciplined clock system 200, with reference to FIG. 7, reference clock 104 includes antenna 50 that receives common view signal 110 (CVS 110) from common view clock 102 and communicates common view signal 52; time receiver 54 that receives common view signal 52 from antenna 50 and produces receiver timing signal 56 (RTS 56); reference time scale 58 produces reference timing signal 60 (REF); time interval counter 62 that is in communication with time receiver 54 and reference time scale 58 to receive receiver timing signal 56 (RTS) and reference timing signal 60 (REF) respectively therefrom, wherein time interval counter 62 produces reference time difference (RTD=RES−RTS) between receiver timing signal 56 (RTS) and reference timing signal 60 (REF); and controller 66 to receive reference time difference 64 (RTD) and to produce reference signal 116 that includes reference time difference 64 (RTD).

Common view signal (108, 110) from common view clock 102 (e.g., GNSS satellite) is received at disciplined clock 100 and reference clock 104 that are within a coverage area of a given common view clock 102. A total number of reference clocks 104 or disciplined clocks 100 is not limited. It is contemplated that a number of reference clocks can be less than 10. A number of disciplined clocks 100 can be hundreds or thousands of disciplined clocks 100 that can be located anywhere on Earth (e.g., land, water, or air) or a selected location in space, e.g., on an orbiting spacecraft.

In an embodiment, disciplined clock system 200 includes a plurality of reference clocks 104; a plurality of disciplined clocks 100; and common view clock 102. Here, the plurality of reference clocks 104 includes first reference clock 104A; and second reference clock 104B, wherein first reference clock 104A and second reference clock 104B independently produce UTC(NIST) time. First reference clock 104A is located in Boulder, Colo. and produces first reference timing signal REF1, and second reference clock 104B is located in Fort Collins, Colo. and produces second reference timing signal REF2. The plurality of disciplined clocks 100 includes first disciplined clock 100A located in New York, N.Y. that produces first local timing signal LTS1; and second disciplined clock 100B located in Los Angeles, Calif. that produces second local timing signal LTS2.

Additionally, common view clock 102 provides common view signal 108 that is received by first disciplined clock 100A and second disciplined clock 100B. First disciplined clock 100A and second disciplined clock 100B independently include first time receiver 4 (e.g., a GNSS receiver) that produces receiver timing signal 14 (RTS, that can be, e.g., a 1 pulse per second (pps) signal) that is respectively compared continuously to local timing signals 16 (i.e., first local timing signal LTS1 and second local timing signal LTS2 that are, e.g., a 1 pps signal) output from local clock 10 at first disciplined clock 100A and second disciplined clock 100B. The comparison includes a time interval measurement made with time interval counter 6 with measurements recorded, e.g., in units of nanoseconds, such that time interval counter 6 produces first local time difference LTD1 (LTD1=LTS−RTS) and second local time difference LTD2 (LTD2=LTS2−RTS), respectively at first disciplined clock 100A and second disciplined clock 100B.

Also, first reference clock 104A and second reference clock 104B receive common view signal 110 communicated from common view clock 102. First reference clock 104A and second reference clock 104B independently include second time receiver 54 (e.g., a GNSS receiver) that produces receiver timing signal 56 (RTS, that can be, e.g., a 1 pps signal) that is respectively compared continuously to reference timing signals 60 (i.e., first reference timing signal REF1 and second reference timing signal REF2 that are, e.g., 1 pps signals) output from reference time scale 58 (here, UTC(NIST) time)) at first reference clock 104A and second reference clock 104B. The comparison includes a time interval measurement made with time interval counter 62 with measurements recorded, e.g., in units of nanoseconds, such that time interval counter 62 produces first reference time difference RTD1 (RTD1=REF1−RTS) and second reference time difference RTD2 (RTD1=REF1−RTS), respectively at first disciplined clock 100A and second disciplined clock 100B.

Accordingly, in this disciplined clock system 200, four total measurements are recorded every second that include: RTD1 (recorded in Boulder, Colo. by first reference clock 104A), RTD2 (recorded in Fort Collins, Colo. by second reference clock 104B), LTD1 (recorded in New York, N.Y. by first disciplined clock 100A), and LTD2 (recorded in Los Angeles, Calif. by second disciplined clock 100B).

RTD1, RTD2, LTD1, and LTD2 are determined every second, and data are averaged over 10 minutes for every common view clock 102 (e.g., GNSS satellite) in view during the 10-minute averaging period. It is contemplated that a shorter averaging period could be used such as a 1-minute averaging period. Data are stored in a file that contains a UTC time stamp, extracted from the GNSS broadcast, and a time difference (e.g., LTD, RTD, and the like) measurement for every GNSS satellite in view. FIG. 8 shows a portion of a data file, wherein GPS was common view clock 102. Rows in FIG. 8 include a time stamp in the first column and 32 space-delimited columns, wherein columns 2 to 33 correspond to a single GPS satellite in which entries in the rows for the satellites are sorted in an order of a pseudo-random noise (PRN) code of the satellites. If the column contains a number, the satellite was in view of the respective clock (disciplined clock (100A or 100B) or reference clock (104A or 104B), wherein the number was either LTD, for measurements recorded at disciplined clock sites, or RTD, for measurements recorded at reference clock sites. Measurements were made at the receiving site (i.e., of clock 100A, 100B, 104A, or 104B) during the entire 10-minute averaging period, wherein 600 one-second measurements were made. If the column contains a dash (-), the satellite was not in view at the receiving site during the 10-minute averaging period such that less than 600 one-second measurements were recorded. The files can be stored in a selected data format such as binary format, can be encrypted to increase the level of security, and the like.

Figure 9:
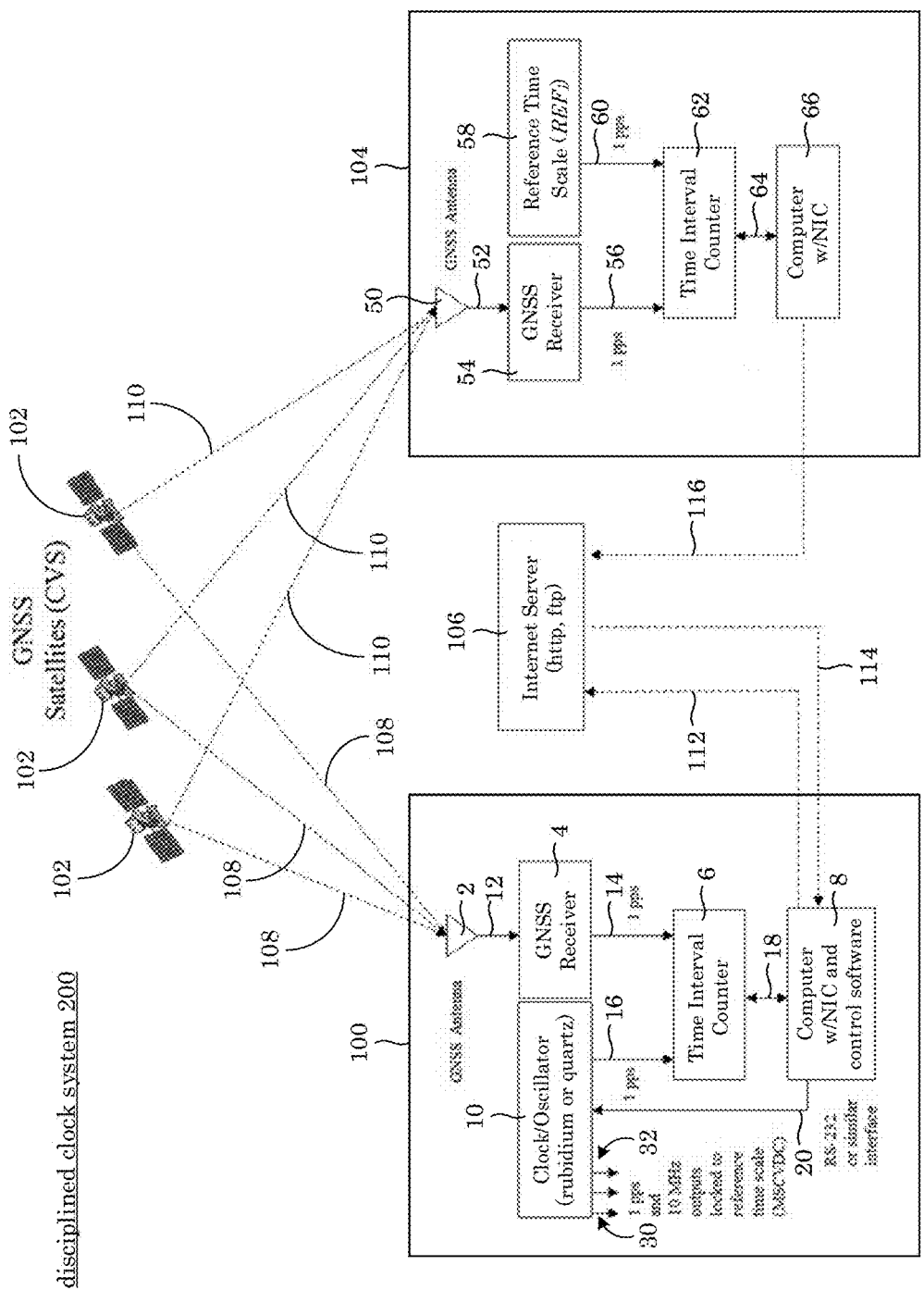
FIG. 9 shows a disciplined clock system.

In an embodiment, after the data files are stored, files are prepared to be processed. Before the files can be processed, some or all of the files can be transferred to another location. With reference to FIG. 9, each disciplined clock 100 uploads its data to remote timing analyzer 106 (e.g., an Internet server). A frequency of the upload can be equivalent to a length of the averaging period, e.g., every 10 minutes. In this manner, when a new data point is obtained, the data point can be uploaded to remote timing analyzer 106. The file upload can be performed with file transfer protocol (FTP) including transmission control protocol/Internet protocol (TCP/IP) ports 20 and 21, or the like. After the files are processed by remote timing analyzer 106, the results are communicated as analyzer signal 114 to each disciplined clock 100. The communication can be accomplished through a variety of ways, including via hypertext transfer protocol (HTTP), TCP/IP port 80, or a combination thereof, and the like. Here, disciplined clock 100 uploads local signal 112 (that includes local time difference 18) and downloads analyzer signal 114 (that includes, e.g., a clock correction as remote time difference (e.g., RemTD=REF1–LTD) via the Internet. Advantageously, data files are stored at a central repository, namely remote timing analyzer 106. Accordingly, a monitoring web site can show time differences of a plurality of disciplined clocks compared with reference time clocks or other disciplined clocks.

Figure 10:
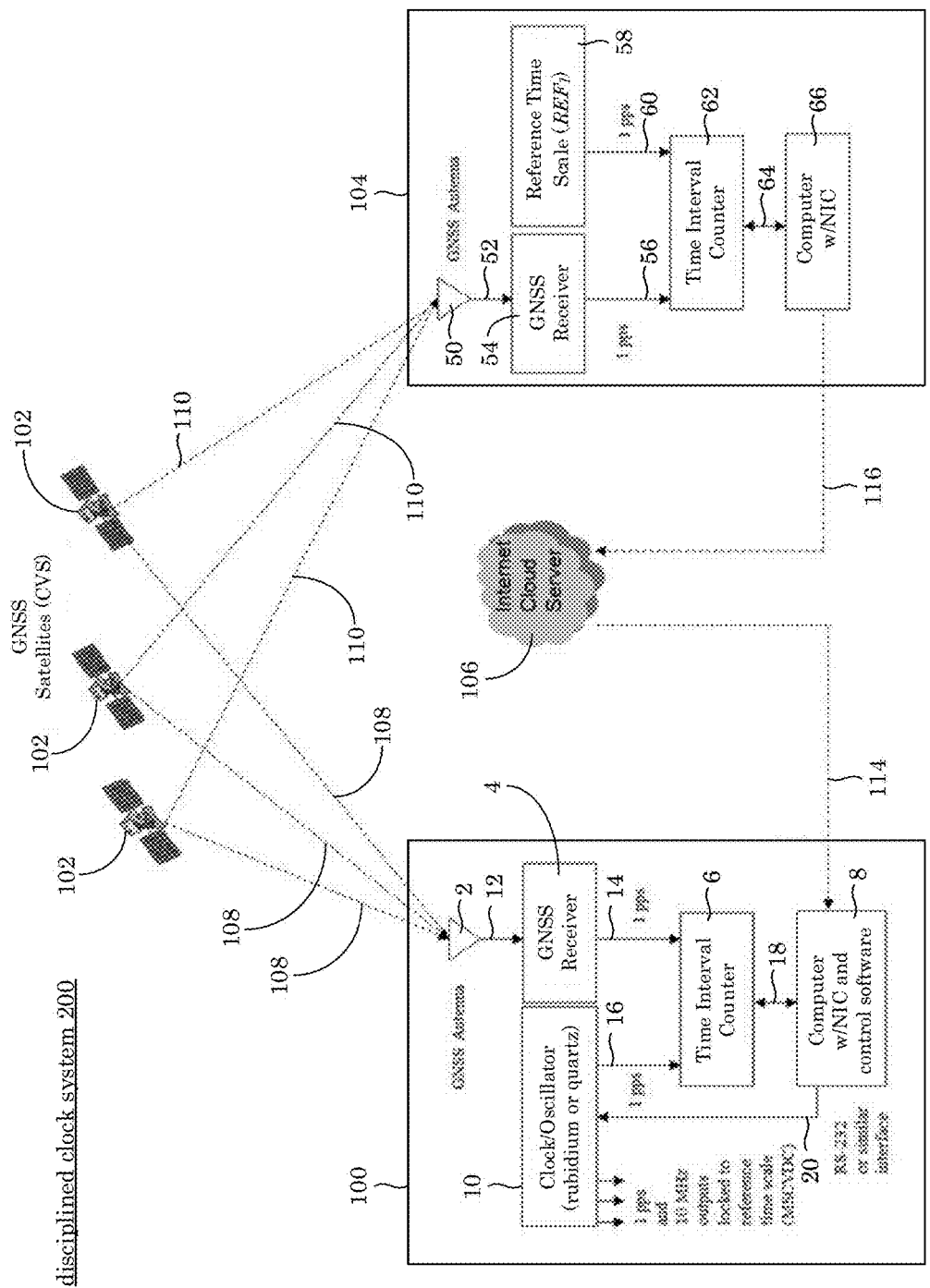
FIG. 10 shows a disciplined clock system.

In an embodiment, with reference to FIG. 10, reference clocks 104 send their respective data files as reference signals 116 to remoting timing analyzer (e.g., a cloud server such as Google Cloud or the like), wherein the data files included in reference signal 116 is downloaded by disciplined clock 100 as analyzer signal 114. Here, disciplined clock 100 does not upload any files as local signal 112 to remote timing analyzer 106. Instead, disciplined clock 100 downloads data as analyzer signal 114 from remote timing analyzer 106. Accordingly, a first disciplined clock does not compare time to a second disciplined clock because data from the first disciplined clock is not publicly available.

A difference between the two immediately described methods is that remote timing analyzer 106 (instead of disciplined clock 100) processes the data in the former method described with reference to FIG. 9. In the latter method described with reference to FIG. 10, disciplined clock 100 (instead of remote timing analyzer 106) processes the data in a presence of remote timing analyzer 106 (here a cloud server) that stores data. Data processing to provide remote timing difference RemTD by remote timing analyzer 106 and disciplined clock 100 can be similar or identical.

In a common-view technique, a plurality of clocks can be compared directly because the time broadcast by common view clock 102 cancels when timing measurements recorded at different clock are subtracted from each other. Delays that are common to both signal paths from the clocks also cancel. Uncorrected delay differences between the signal paths add uncertainty to the time kept by disciplined clock 100. A common-view equation, for calculating first remote time difference RemTD1 between first reference clock 104A in Boulder (that provides first reference timing signal REF1) and first disciplined clock 100A in New York (that provides first local timing signal LTS1) is $$(REF1-LTS1)+(E_{REF1}-E_{LTS1})=(REF1-CVS)-(LTS1-CVS) \quad (1),$$

wherein $(E_{REF1}-E_{LTS1})$ is the error term that represents the uncertainty of the time kept by first disciplined clock 100A. The error term includes delay differences between the sites for first disciplined clock 100A and first reference clock 104A produced by ionospheric and tropospheric delays, multipath signal reflections, environmental conditions, calibration errors, errors in the GNSS antenna coordinates, and the like. Uncertainty of the time kept by disciplined clock 100 with respect to reference clock 104 can be reduced to about 10 nanoseconds.

Because a plurality of common view signals (108, 110) are obtained during a 10-minute averaging period (multiple satellites are typically in-view at sites for disciplined clock 100 and reference clock 104), obtaining remote time difference RemTD includes: aligning and subtracting time interval measurements stored, e.g., in data files for first reference timing signal $REF_1$ and for first local timing signal LTS1; and discarding data collected from satellites that are not in common view at both sites. The average remote time difference RemTD between clocks (100 104) at the two sites is obtained from Equation 2:

$$RemTD = \frac{\sum_{i=1}^{N}(RTD_i - LTD_i)}{N}, \quad (2)$$

wherein i is the index of summation; N is the number of satellites tracked as common view clocks 102 at both sites; $RTD_i$ is the plurality of reference time differences 64 recorded at i-th (e.g., first, second, and the like) reference clock 104 (e.g., 104A, 104B, and the like), and $LTD_i$ is the plurality of local time differences 18 recorded at i-th (e.g., first, second, and the like) disciplined clock 100 (e.g., 100A, 100B, and the like).

In an embodiment, disciplined clock 100 is located at a distance from reference clock 104 such that that few or no common view clocks 102 are in common-view of disciplined clock 100 and reference clock 104. Here, an all-in-view method includes not aligning satellite tracks such that no tracks are discarded. Instead, averages of $RTD_i$ and $LTD_i$ data are calculated independently, and remote time difference RemTD is the difference between the two averages. Software in controller 8 of disciplined clock 100 can employ the all-in-view method when the distance of disciplined clock 100 from reference time clock 104 is greater than, e.g., 5000 kilometers (km).

In an embodiment, disciplined clock 100 includes controller 8 that is a control loop feedback controller to control local clock 10. The control loop feedback controller can include a proportional-integral-derivative controller. Here, adaptive proportional-integral-derivative (PID) controller 22 (see, e.g., FIG. 6) can be implemented in software or hardware. PID controller 22 disciplines local oscillator 26 (LO) of local clock 10 of disciplined clock 100. Here, PID controller 22 corrects the error (E) between a measured process variable (e.g., the remote time difference obtained with either Equation 1 or Equation 2) and a desired set point (SP), which can be normally 0. In this case, the desired value of SP for LTS1 is 0 to lock disciplined clock 100 to reference time scale 58 of reference clock 104. It is contemplated that the process variable is RemTD (e.g., from Equation. (2)), the last remote time difference between local time difference 18 (LTD) and reference time difference 64 (RTD).

As shown in FIG. 9, PID controller 22 obtains an already processed value for remote timing difference RemTD by downloading RemTD from remote timing analyzer 106 (e.g., the Internet server). As shown in FIG. 10, software in controller 8 of disciplined clock 100 produces remote timing difference RemTD locally and communicated the value of RemTD to PID controller 22. PID controller 22 obtains RemTD and converts RemTD to a dimensionless frequency correction 20 that is communicated to LO 26 through a computer interface. This measure and correct process is repeated every 10 minutes to keep disciplined clock 100 locked to reference time scale 58 of reference clock 104.

To compensate for small changes of the frequency of oscillator 26 of disciplined clock 100, the control loop provided by controller 8 in disciplined clock 100 can be tuned to have a low natural frequency and a narrow bandwidth. It is contemplated that once disciplined clock 100 is locked to reference clock 104, the control loop is dominated by the integral term used in PID controller 22. The bandwidth of the control loop can be software-limited to match the approximate tuning range of LO 26. Time errors can be corrected through a frequency adjustment. For initial synchronization or to speed up the time to lock disciplined clock 100 to reference clock 104, a time adjustment can be performed.

In an embodiment, disciplined clock 100 is locked when LO 26 is accurate to within a selected accuracy time (e.g., 50 nanoseconds) of reference time scale 58 and is stable to within a selected stability time (e.g., 5 nanoseconds) as estimated with time deviation $\sigma_x(\tau)$, at $\tau=10$ minutes. The time deviation is a metric for time stability based on a modified Allan deviation, Mod $\sigma_y(\tau)$ that can be computed as provided in Equation 3.

$$\sigma_x(\tau) = \frac{\tau}{\sqrt{3}} \text{Mod} \sigma_y(\tau) \quad (3)$$

In controller 8 of disciplined clock 100, software or hardware distinguishes between a soft lock (e.g., based on the 50/5 criteria in the preceding paragraph) or a hard lock that occurs when the accuracy of disciplined clock 100 is within 10 nanoseconds of reference time scale 58, and the time deviation of disciplined clock 100 is less than 2 nanoseconds.

Disciplined clock 100 stores recent frequency correction 20 that is communicated to oscillator 26. If disciplined clock 100 loses lock to reference clock 104, e.g., due to unavailability (e.g., an outage of communication) of remote timing analyzer 106 or common view clock 102, local timing signal 16 (e.g., the 1 pps timing output from local clock 10) can be resynchronized to reference time scale 58, and the frequency of local clock 10 can be restored to the last recent hard lock condition after the outage ends and communication with remote timing analyzer 106 or common view clock 102 is established. During reacquisition of communication with remote timing analyzer 106 or common view clock 102, PID controller 22 is disengaged until oscillator 26 reaches a steady state condition such with respect to the reference time scale in which at least three stable remote time differences have been consecutively recorded describe "reaches a steady state condition such with respect to the reference time scale," at which time production of frequency correction 20 resumes. As a result, incorrect frequency corrections are avoided such that the overshooting the set point is avoided. An unlocked condition can last for less than one or two hours after remote timing analyzer 106 and common view clock 102 are accessible again.

Advantageously and unexpectedly, disciplined clock 100 provides fail-safe redundancy in which disciplined clock 100 has a fail-safe backup in an absence of reference clock 104, common view clock 102, or remote timing analyzer 106. The fail-safe backup for reference clock 104 is achieved by processing reference time difference 64 (e.g., available in reference signal 116) from a plurality of reference clocks 104. In an embodiment, first reference time difference RTD1 and second reference time difference RTD2 from the NIST time scales located in Boulder and Fort Collins, Colo. are automatically processed, but other reference clocks 104 could be added. It is contemplated that any time scale that makes common-view measurement data available to disciplined clock 100 could be selected as a time reference for disciplined clock 100. In an embodiment, the national time scales of Brazil, Canada, Mexico, Panama, and the like provide common-view data through the Interamerican Metrology System (SIM) Time Network. Accordingly, such national time scale could be used as reference clock 104.

Disciplined clock 100 switches to a different reference clock 104 when the currently selected reference clock 104 is unavailable or when time provided by current reference clock 104 cannot be validated. If first reference clock 104A is unavailable, disciplined clock 100 switches to second reference clock 104B if the period of unavailability of first reference time difference RTD1 is greater than a holdover time of local oscillator 26, which, e.g., can be one hour for a rubidium oscillator. If the time (e.g., first reference time difference RTD1) provided by first reference clock 104A cannot be validated, disciplined clock 100 switches immediately to second reference clock 104B. The time of first reference clock 104A is validated through cross comparison with the other reference time clocks and the common view signal from common view clock 102. Validation is performed when (e.g., every 10 minutes) new data for common view signal 108 is available.

In an embodiment, a fail-safe backup for common view clock 102 is provided by time receiver 4 and antenna 2 that receive common view signal 108 from a plurality of common view clocks 102. In a certain embodiment, if GPS reception is unavailable, disciplined clock 100 switches to another GNSS constellation of satellites, such as GLONASS, Galileo, the BeiDou Navigation Satellite System (BDS) of China, or the like to receive common view signal 108.

Disciplined clock 100 communicates data via the Internet from remote timing analyzer 106, which can be a server that processes the common-view data or an Internet cloud server that provides data storage. To provide further fail-safe redundancy, both data transfer techniques (i.e., server and cloud platforms) can be used. If the data processing server as remote timing analyzer 106 fails to provide data to disciplined clock 100, the measurement data can be retrieved from the Cloud, and software or hardware in controller 8 of disciplined clock 100 performs data processing to determine frequency correction 20. If data transfer over the Internet is unavailable, disciplined clock 100 automatically begins disciplining local clock 10 to common view signal 108 from common view clock 102, wherein local time difference 18 is used as a substitute for remote time difference RemTD in an absence of analyzer signal 114. Here, disciplined clock 100 can become, e.g., a GNSS-disciplined clock. Disciplined clock 100 can remain disciplined to common view clock 102 instead of reference clock 104 until Internet access is restored to provide communication to remote timing analyzer 106. A list of fail-safe backups for fail-safe redundancy of disciplined clock 100 is provided in the Table.

TABLE

| | Reference clock | Common view clock | Data Network to access remote timing analyzer |
|---|---|---|---|
| Primary source | UTC (NIST), Boulder | GPS | Public Internet |
| Backup Source | UTC (NIST), Fort Collins; or National time scale synchronized to UTC; or Private time scale synchronized to UTC | GNSS system (GLONASS, Galileo, BDS); or Signal from geostationary satellite; or Signal from terrestrial low frequency (LF) radio station | Discipline clock to GNSS signal if network fails |

It is contemplated that if a network outage (e.g., failure of connectivity to the Internet) occurs such that communication with remote timing analyzer 106 is absent, disciplined clock 100 is disciplined to common view signal 108 from common view clock 102 such as a GNSS signal. A network outage is likely to be short (e.g., a few minutes in duration), and time from common view clock is a temporary backup to provide clock holdover for local clock 10 until communication with remote timing analyzer 106 via the network is restored.

It further is contemplated that simultaneously jamming may occur of common view clocks 102 (e.g., GNSS signal sources, including GPS, GLONASS, Galileo, BDS, and the like) that provide common view signals (108, 110). If all common view signals from common view clocks 102 are jammed, oscillator 26 runs free, and a time error accumulates until reception from common view clock 102 is restored. However, a duration of jamming is likely to be short, and a probability of simultaneously jamming all common view signals from common view clocks 102 is considerably lower than a probability of jamming a common view signal from one common view clock 102 system (e.g., the Galileo GNSS system). Alternate sources of common view signal (108, 110) can include a signal from a geostationary communication satellite, a terrestrial low frequency radio station, and the like. In an embodiment, such alternate source provides common view signal (108, 110). Here, it is contemplated that disciplined clock 100 or reference clock 104 includes selected components to receive common view signal (108 or 110) from the alternate source so that disciplined clock 100 or reference clock 104 is immune to jamming of signals from a GNSS.

It further is contemplated that when disciplined clock 100 switches from first reference clock 104A to second reference clock 104B or switches from first common view clock 100A to second common view clock 100A, disciplined time 32 or disciplined frequency 30 kept by disciplined clock 100 may shift. A magnitude of the shift of disciplined time 32 can be less than or equal to 100 nanoseconds (ns), specifically from 1 ns to 100 ns.

It further is contemplated, e.g., for security reasons, files containing clock measurement data (e.g., local timing signal 16, receiver timing signal 14, local time difference 18, and the like) are encrypted before transferred over the Internet to remote timing analyzer 106 from disciplined clock 100.

Unexpectedly, disciplined clock 100 is a more versatile and robust clock than a conventional GNSS-disciplined clock because disciplined clock 100 provides selection of the time reference scale that is used to discipline local clock 10 of disciplined clock 100. In an embodiment, NIST time (instead of GPS time) is implemented, e.g., for a legal or technical reason. Disciplined clock 100 synchronizes to the time kept by NIST (e.g., from Boulder or Fort Collins, Colo.) or by another timing source (such as a laboratory or national timing source) through common-view of accessible common view clocks 102. Further, disciplined clock 100 also provides fail-safe layers of redundancy that a GNSS-disciplined clock does not provide in an absence of access to reference clock 104. Moreover, if remote timing analyzer is unavailable, e.g., due to a network link failure, disciplined clock 100 can switch to time obtained through common view clock 102 (e.g., GNSS satellites) to provide holdover until remote timing analyzer 106 communication via the network connection is restored. If reference time scale 58 from first reference clock 104A is unavailable, disciplined clock 100 can automatically switch to second reference time clock 104B by accessing common-view data as reference time difference 64 from second reference time clock 104B.

In a particular embodiment, time receiver 4 of disciplined clock 100 receives common view signal 102 from a global positioning system (GPS) satellite when reception from the GPS satellite is available. It is contemplated that time receiver 4 receives common view signal 102 from a global navigation satellite system (GNSS) satellite when: reception from the GPS satellite is unavailable; and reception from the GNSS satellite is available. It is further contemplated that time receiver 4 receives common view signal 102 from a geostationary satellite when: reception from the GPS satellite is unavailable; reception from the GNSS satellite is unavailable; and reception from the geostationary satellite is available. It also is contemplated that time receiver 4 receives common view signal 4 from a terrestrial low frequency radio station when: reception from the GPS satellite is unavailable; reception from the GNSS satellite is unavailable; and reception from the terrestrial low frequency radio station is available.

In some embodiments, disciplined clock 100 receives frequency correction 20 from remote timing analyzer 106 that includes a data server available via public Internet. Remote timing analyzer 106 can be in electrical communication with the reference clock, wherein reference clock 104 provides reference time difference 64 to remote timing analyzer 106, and remote timing analyzer 106 produces frequency correction 20 based on reference time difference 64. In an embodiment, reference time clock 104 includes reference time scale 58 and receives common view signal 110 from common view clock 102; produces reference time difference 64 as a difference between reference time scale 58 and a time (e.g., reference timing signal 60) derived from common view signal 110; and communicates reference time difference 64 to remote timing analyzer 106. In a certain embodiment, reference time scale 58 includes: a primary source time, based on coordinated universal time (UTC); or a secondary source time, based on a national time scale or private time scale that are synchronized to UTC, wherein reference time scale 58 is the primary source time when the primary source time is available, and reference time scale 58 is the secondary source time when the primary source time is unavailable.

In an embodiment, a process for producing a disciplined time and a disciplined frequency includes, e.g., by disciplined clock 100: receiving common view signal 108 from common view clock 102; producing first receiver timing signal 14 from common view signal 108; producing local timing signal 16 by local clock; determining local time difference 18 between local timing signal 16 and first receiver timing signal 14; communicating local time difference 18 to remote timing analyzer 106; receiving frequency correction 20 by controller 8 from remote timing analyzer 106, frequency correction 20 based on remote time difference RemTD between local time difference 18 and reference time difference 64 from reference clock 104; and controlling local clock 10 by controller 8 such that local clock 10 produces disciplined frequency 30 and disciplined time 32, based on frequency correction 20. The process further includes, by remote timing analyzer 106: receiving local time difference 18 from disciplined clock 100 and reference time difference 64 from reference clock 104; determining remote time difference RemTD from local time difference 18 and reference time difference 64; determining frequency correction 20 from remote time difference RemTD; and communicating frequency correction 20 to disciplined clock 100. The process also includes, by the reference clock: receiving common view signal 110; producing second receiver timing signal 56 from common view signal 110; producing reference timing signal 60 from reference time scale 58; determining reference time difference 64 from reference timing signal 60 and second receiver timing signal 56; and communicating reference time difference 64 to remote timing analyzer 106.

In an embodiment, wherein reference clock 104 comprises a plurality of reference clocks (e.g., 104A, 104B, and the like), the process further includes: in an absence of reception from first reference clock 104A, switching disciplined clock 100 to use remote time difference RemTD that is based on reference time difference 64 provided by second reference clock 104B.

In an embodiment, wherein common view clock 102 comprises a plurality of common view clocks (e.g., 102A, 102B, and the like), the process further includes: in an absence of reception from first common view clock 102A, switching disciplined clock 100 to use common view signal 102 from second common view clock 102B.

In an embodiment, the process further includes, in an absence of reception of common view signal 102 by disciplined clock 100: communicating remote time difference RemTD to local clock 10 from remote timing analyzer 106; receiving remote time difference RemTD by local clock 10 from remote timing analyzer 106; and synchronizing local clock 10 to reference clock 104, based on remote time difference Rem TD.

According to an embodiment, a process for producing a disciplined time and a disciplined frequency includes, by disciplined clock 100: receiving common view signal 108 from common view clock 102; producing first receiver timing signal 14 from common view signal 108; producing local timing signal 16 by local clock; determining local time difference 18 between local timing signal 16 and first receiver timing signal 14; retrieving reference time difference 64 from remote timing analyzer 106, reference time difference 64 based on reference time scale 58 from reference clock 104; determining remote time difference RemTD from local time difference 18 and reference time difference 64; converting remote time difference RemTD to frequency correction 20; and applying frequency correction 20 to local clock 10 such that local clock 10 produces disciplined frequency 30 and disciplined time 32, based on frequency correction 20. The process further can include, by disciplined clock 100 in an absence of reception of common view signal 102: applying remote time difference RemTD to local clock 10 to synchronize local clock 10 to reference clock 104, prior to applying frequency correction 20 to local clock 10. The process also can include, by remote timing analyzer 106: receiving reference time difference 64 from reference clock 104; and communicating reference time difference 64 to disciplined clock 100. The process can include, by the reference clock: receiving common view signal 110; producing second receiver timing signal 56 from common view signal 110; producing reference timing signal 60 from reference time scale 58; determining reference time difference 64 from reference timing signal 60 and second receiver timing signal 56; and communicating reference time difference 64 to remote timing analyzer 106.

In an embodiment, wherein reference clock 104 includes a plurality of reference clocks (e.g., 104A, 104B, and the like), the process further includes: in an absence of reception from first reference clock 104A, switching disciplined clock 100 to use reference time scale 58 from second reference clock 104B.

In an embodiment, wherein common view clock 102 includes a plurality of common view clocks (e.g., 102A, 102B, and the like), the process further includes: in an absence of reception from first common view clock 102A, switching disciplined clock 100 to use common view signal 108 from second common view clock 102B.

Figure 11:
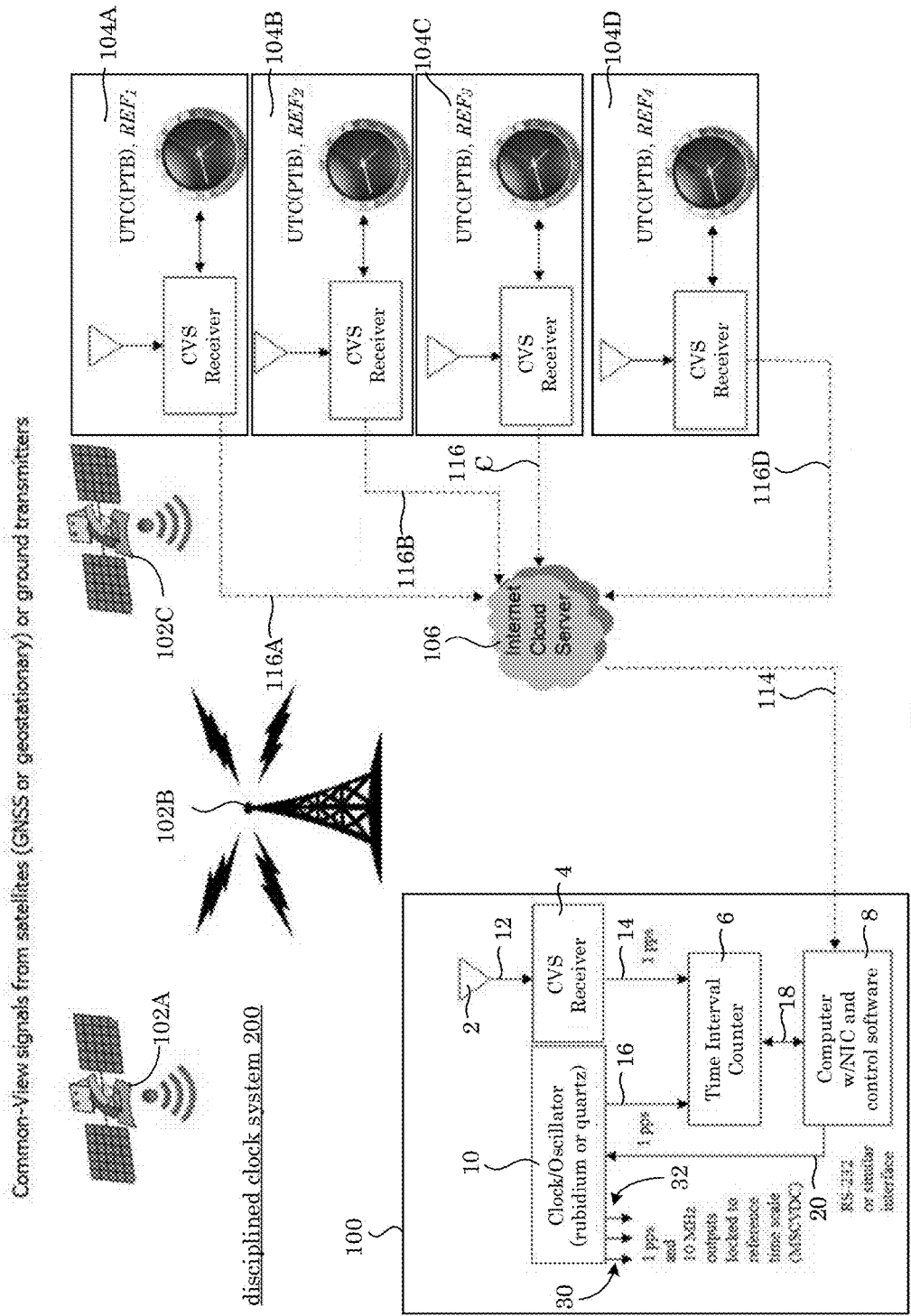
FIG. 11 shows a disciplined clock system.

With reference to FIG. 11, disciplined clock 100 can switch among a plurality of reference clocks (104A, 104B, 104C, 104D, and the like) or among a plurality of common view clocks (102A, 102B, 102C, and the like).

Figure 12:
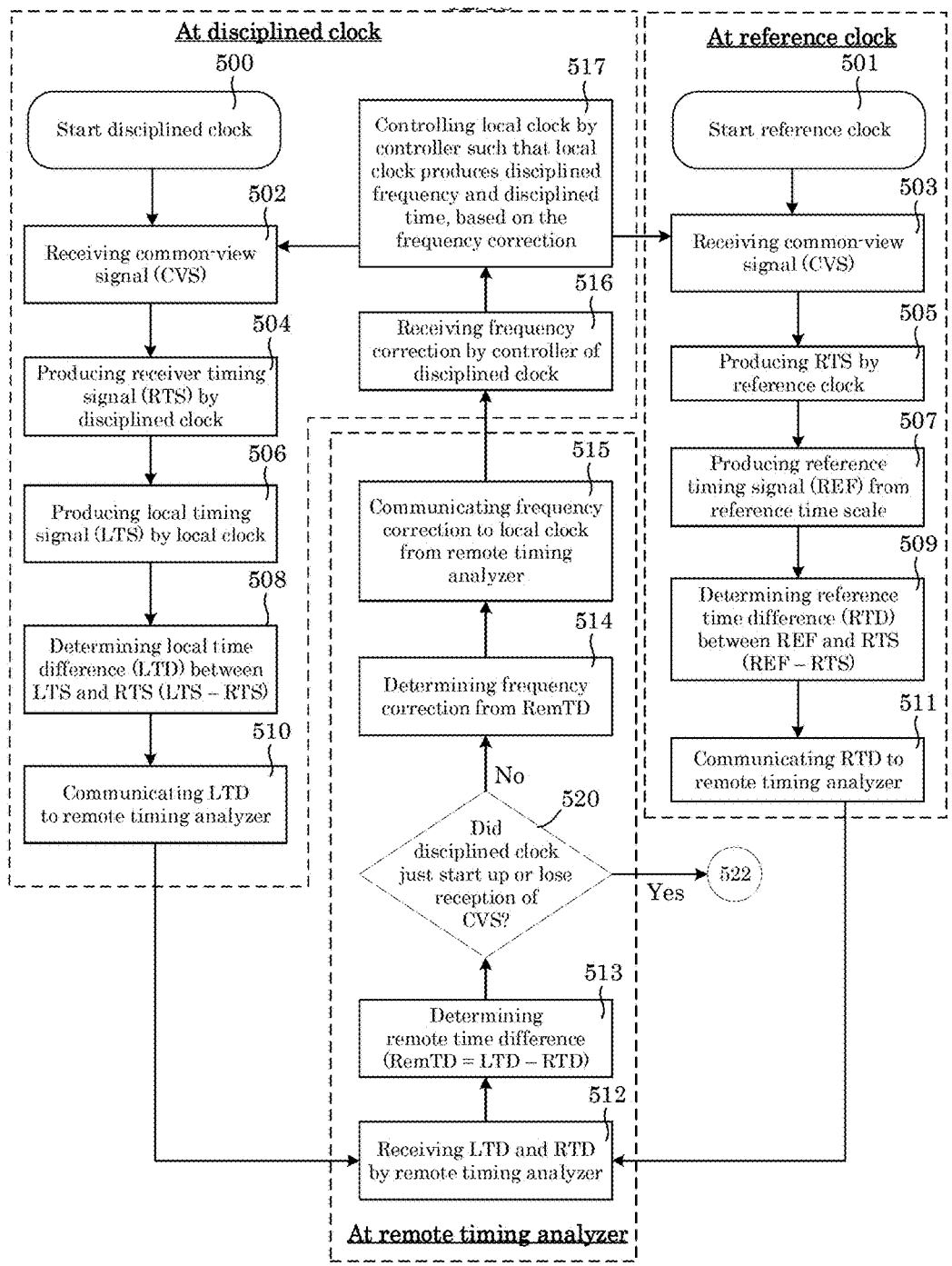
FIG. 12 shows a flow chart for producing a disciplined frequency and a disciplined time by a disciplined clock.
Figure 13:
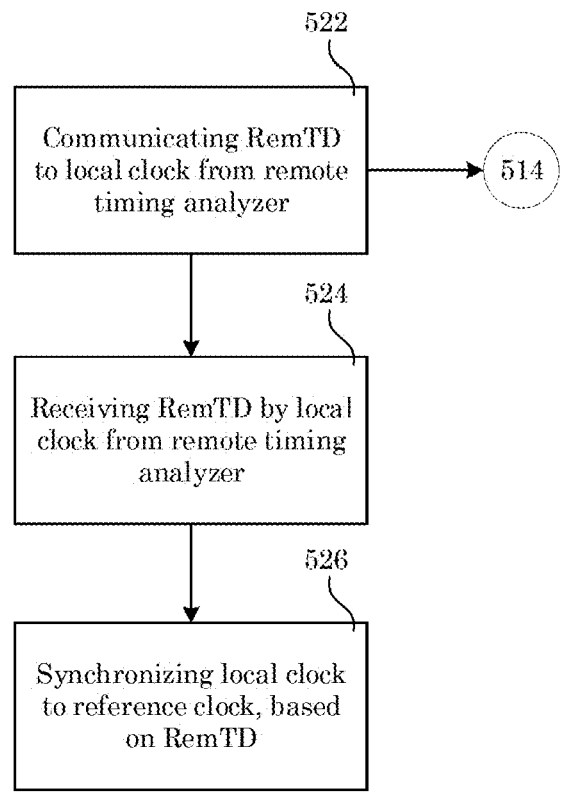
FIG. 13 shows a flow chart for synchronizing a local clock of a disciplined clock to a reference clock.

In an embodiment, with reference to FIG. 12, a process for providing disciplined frequency 30 or disciplined time 32 by disciplined clock 100 includes locking local clock 10 to reference clock 104. Here, disciplined clock 100 and reference clock 104 that can be located at different sites are started (steps 500 and 501). Disciplined clock 100 and reference clock 104 receive common-view signal (CVS) (108, 110, respectively) that is accessible at both sites (steps 502 and 503). Common view signal (108, 110) is provided by common view clock 102 that can be a satellite or ground-based transmitter. Time receivers (4, 54) of clocks (100, 104) at both sites produce receiver timing signal (14, 56) (steps 504 and 505). At the site of disciplined clock 100, local timing signal 16 is produced by local clock 10 (step 506), and local time difference 18 between local timing signal 16 and receiver timing signal 14 is produced by time interval counter 6 or a similar instrument or circuit (step 508). At the site of reference clock 104, reference clock 100 for produces reference timing signal 60 (step 507) from reference time scale 58, and then receiver 54 produces receiver timing signal 56. Time interval counter 62 produces reference time difference 64 that is the time difference between receiver timing signal 56 and reference timing signal 60 as measured by time interval counter 62 or a similar instrument or circuit (step 509). The two measurements (LTD=LTS−RTS; and RTD=REF−RTS) are communicated to remote timing analyzer 106 (e.g., a network server) (steps 510 and 511). Remote timing analyzer 106 receives and stores the two measurements (step 512). An application, e.g., an applet, on remote timing analyzer 106 computes the difference between the two measurements and produces remote time difference RemTD as a difference between local time difference 18 and reference time difference 64, i.e., RemTD=LTD−RTD (step 513). If disciplined clock 100 has just been started (step 500) or has recently lost synchronization (determined at step 520) due to a signal interruption (such as a network outage), RemTD is used to synchronize local clock 10 to reference clock 104 (steps 522-526, shown in FIG. 13). RemTD is converted to frequency correction 20 (step 514) that is communicated via the network from remote timing analyzer 106 to disciplined clock 100 (step 515), received by controller 8 of disciplined clock 100 (step 516), and applied to local clock 10 that produces disciplined frequency 30 and disciplined time 32 (step 517). Frequency correction 20 is produced via a continuous frequency control loop and locks the frequency of local clock 10 to reference clock 104 (step 517). After frequency correction 20 (step 516) and time correction (step 513, optional) are applied, the process can repeat at steps 502 and 503.

Figure 14:
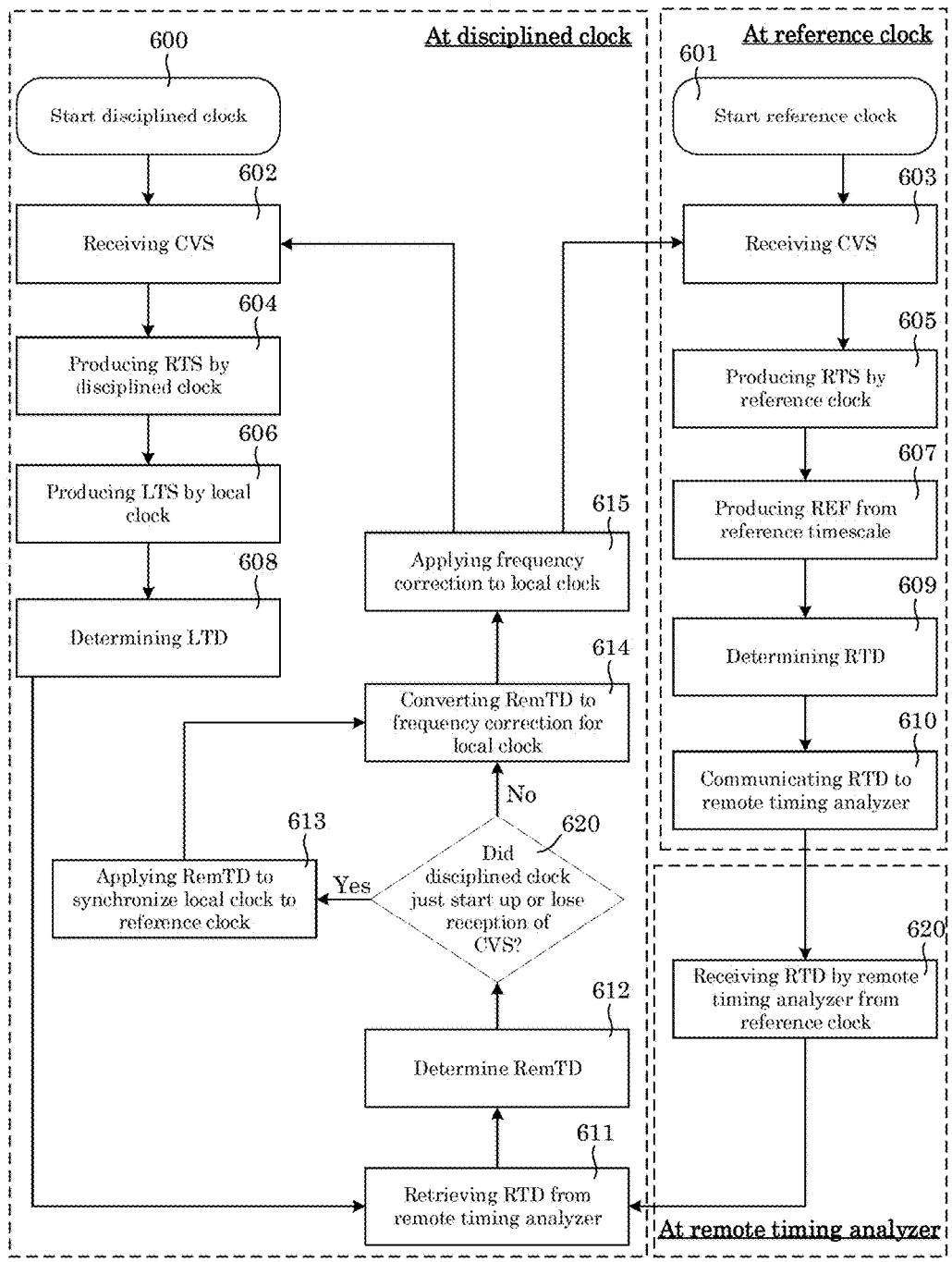
FIG. 14 shows a flow chart for producing a disciplined frequency and a disciplined time by a disciplined clock.

In an embodiment, with reference to FIG. 14, a process for providing disciplined frequency 30 or disciplined time 32 by disciplined clock 100 includes locking local clock 10 to reference clock 104. Here, disciplined clock 100 and reference clock 104 that can be located at different sites start (steps 600 and 601) and receive common view signal (108, 110) that is accessible at both sites (steps 602 and 603). Common view signal (108, 110) is provided by common view clock 100 to that can be a satellite or a ground-based transmitter. Time receivers (4, 54) of clocks (100, 104) produce receiver timing signal (14, 56) (steps 600 for and 605). At the site of disciplined clock 100, local timing signal 16 is produced by local clock 10 (step 606), and local time difference 18 between local timing signal 16 and receiver timing signal 14 is produced by time interval counter 6 or a similar instrument or circuit (step 608). At the site of reference clock 104, reference clock 104 produces reference timing signal 60 (step 607) from reference time scale 58, and time receiver 54 produces receiver timing signal 56. Time interval counter 62 produces reference time difference 64 that is the time difference between receiver timing signal 56 and reference timing signal 60 as measured by time interval counter 62 or a similar instrument or circuit (step 609). Reference time difference 64 (RTD=REF−RTS) is communicated to remote timing analyzer 106 (e.g., an Internet cloud server) for storage (step 611). Remote timing analyzer 106 receives and stores RTD 64 (step 620). Disciplined clock 100 retrieves reference time difference 64 from remote timing analyzer 106 in the cloud (step 611) and subtracts reference time difference 64 from local time difference 18 to produce estimates of remote time difference RemTD, wherein RemTD=LTD−RTD (step 612). If disciplined clock 100 has just been started (step 600) or has recently lost synchronization (determined at step 620) due to a signal interruption (such as a network outage), RemTD is used to synchronize local clock 10 to reference clock 104 (step 613, e.g., as in steps 522-526, shown in FIG. 13). RemTD is converted to frequency correction 20 by controller 8 of disciplined clock 100 (step 614). and applied to local clock 10 that produces disciplined frequency 30 and disciplined time 32 (step 615). Frequency correction 20 is produced via a continuous frequency control loop and locks the frequency of local clock 10 to reference clock 104 (steps 602-615). After frequency correction 20 (step 615) and time correction (step 613, optional) are applied, the process can repeat at steps 602 and 603.

Figure 15:
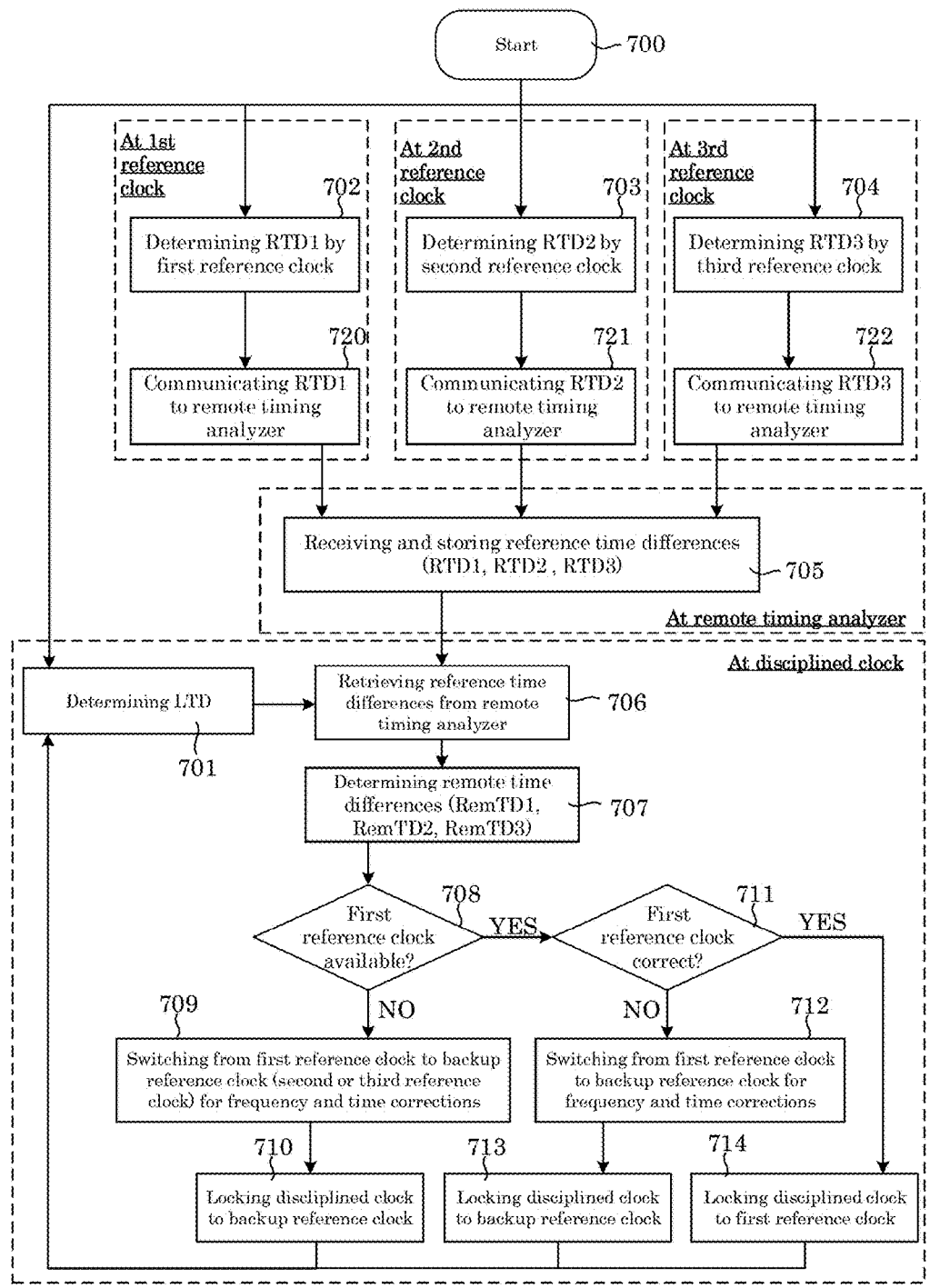
FIG. 15 shows a flow chart for producing a disciplined frequency and a disciplined time by a disciplined clock.

In an embodiment, with reference to FIG. 15, a process for locking disciplined clock 100 to reference clock 104 to provide disciplined frequency 30 or disciplined time 32 by disciplined clock 100 includes receiving a plurality of signal sources that includes: analyzer signal 114 including data (e.g., reference time difference 64, remote time difference RemTD, or a combination thereof, and the like) provided by remote timing analyzer 106; and common view signal 108 provided by common view clock 102. For fail-safe redundancy, disciplined clock 100 can receive signals (e.g., RTD 64, RemTD, common view signal 108, and the like) from a plurality of signal sources (e.g., reference clocks (104A, 104B, and the like) or common view clocks (102A, 102B, and the like) and switches to a backup signal source (e.g., 104B or 102B) if first reference clock 104A or first common view clock 102A fails or is unavailable. Further, disciplined clock 100 lock to common view signal 108 if communication with remote timing analyzer 106, e.g., via a data network, fails. Switching to a backup reference clock, a backup common view clock or locking to the common view signal when remote timing analyzer 106 is absent is described in the following paragraphs.

Reference clock 104 can be a nationally or internationally recognized authoritative source of time. In an embodiment, reference clock 104 is a Coordinated Universal Time (UTC) time scale operated by a national metrology institute such as the National Institute of Standards and Technology (NIST) as the official time of the United States. Reference clock 104 also can be any reference clock that makes common view signal measurements such as reference time difference 64 available. According to an embodiment, for redundancy, three reference clocks 104 (104A, 104B, 104C) are used, but a larger number of reference clocks 104 can be used to provide reference time difference 64. According to the flowchart shown in FIG. 14, disciplined clock 100 and reference clock 104 can be located at different sites in which disciplined clock 100 produces a measurement local time difference 18 (LTD=LTS−RTS) (steps 602, 604, 606, and 608). Reference clocks (104A, 104B, 104C, and the like) independently produce reference time differences (RTD1, RTD2, RTD3, and the like) (steps 603, 605, 607, 609). In an embodiment, with reference to FIG. 15, disciplined clock 100 is started (step 700) and provides a measurement of local time difference 18 (step 701). Reference clocks (104A, 104B, . . . , 104$i$, wherein 104$i$ an arbitrary i-th reference clock) determine reference time differences (RTD1, RTD2, RTD3, and the like) (steps 702, 703, 704) and communicate reference time signals 64 to remote timing analyzer 106, e.g., an Internet cloud server (steps 721, 721, 722). Remote timing analyzer 106 receives and stores reference time differences (RTD1, RTD2, RTD3, and the like) (step 705).

Disciplined clock 100 retrieves available reference time differences from remote timing analyzer 106 (step 706) and computes remote time difference (RemTD1=LTD−RTD1, RemTD2=LTD−RTD2, RemTD3=LTD−RTD3, and the like) for reference clocks (104A, 104B, 104C, and the like) (step 707). Disciplined clock 100 determines if first reference time difference RTD1 from first reference clock 104A is available (step 708). If RTD1 is unavailable for an unacceptable period (e.g., 3600 seconds), the reference time difference 64 from a backup reference clock (e.g., 104B, 104C, or the like) is used to compute frequency correction 20 or the time correction for local clock 10 (step 709), and the local clock 10 is locked to the backup reference clock (step 710). Lock is maintained by a continuous control loop that returns to step 701. If RTD1 is available, controller 8 of disciplined clock 100 determines if RTD1 is correct to within an acceptable tolerance (e.g., 50 nanoseconds (ns)) by comparing RTD1 with reference time differences (e.g., RTD2 RTD3, and the like) from backup reference clocks (e.g., 104B, 104C, and the like) (step 711). If RTD1 is outside an acceptable tolerance (e.g., 50 ns), a reference time difference (e.g., RTD2 RTD3, or the like) from backup reference clocks (e.g., 104B, 104C, or the like) is used to compute frequency correction 20 or a time correction by controller 8 (step 712), and local clock 10 is locked to the backup reference clock (step 713). Lock is maintained by a continuous control loop (return to step 701). If RTD1 is determined to be within an acceptable tolerance (e.g., 50 ns), local clock 10 is locked to first reference clock 104A (step 714). Lock is maintained by a continuous control loop (return to step 701).

Figure 16:
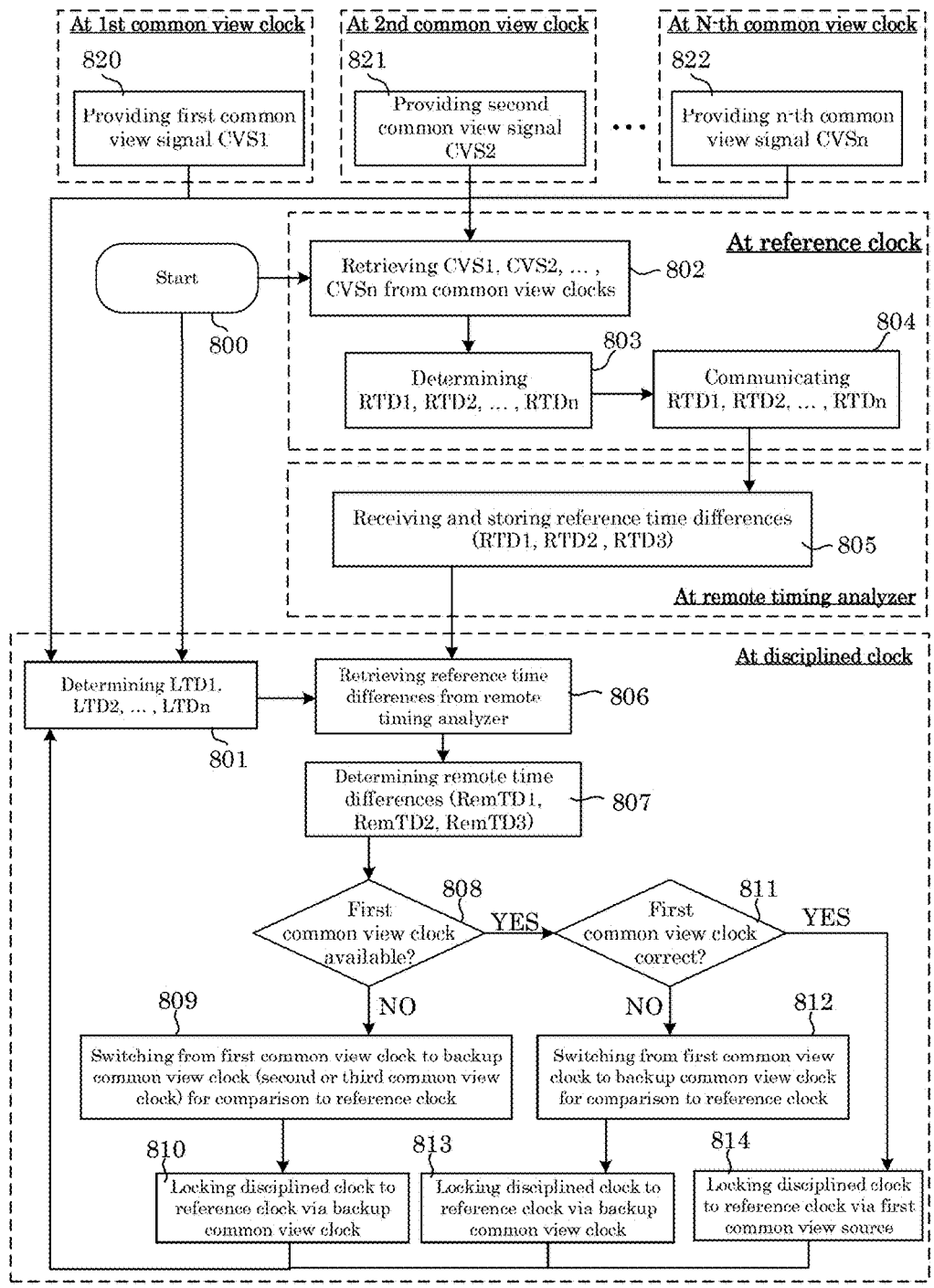
FIG. 16 shows a flow chart for producing a disciplined frequency and a disciplined time by a disciplined clock.

In an embodiment, with reference to FIG. 16, common view clock 102 includes a global navigation system satellite (GNSS), a transmitter such as a ground-based transmitter, a geostationary satellite, and the like. According to an embodiment, common view clock 102 is a GNSS satellite system that provides common view signal 108, wherein disciplined clock 100 receives common view signals 108 from a plurality of GNSS constellations (e.g., GPS, GLONASS, Galileo, Beidou, and the like) so that local clock 10 and reference clock 104 are compared to the plurality of common view clocks. Here, in accord with FIG. 14 and FIG. 16, reference clock 104 and the plurality of common view sources (first common view source 102A, second common view source 102B, third common view source 102C, and the like) are in communication with disciplined clock 100. Common view clocks (102A, 102B,102C) provide common view signals (CVS1, CVS2, CVS3, and the like) such that disciplined clock 100 starts (step 800) and retrieves common view signals (CVS1, CVS2, CVS3, and the like) from common view clocks (102A, 102B,102C) and determines local time differences 18 (LTD1, LTD2, LTD3) (step 801). Exemplary common view clocks include GPS as 102A, GLONASS as 102B, and Galileo as 102C.

Similarly, reference clock 104 retrieves common view signals (CVS1, CVS2, CVS3, and the like) from common view clocks (102A, 102B, 102C) (step 802). Reference clock 104 determines reference time differences 64 (RTD1, RTD2, RTD3) (step 803) and communicates reference time differences 64 (RTD1, RTD2, RTD3) to remote timing analyzer 106 (e.g., an Internet cloud server) (step 804). Remote timing analyzer 106 receives and stores reference time differences 64 (step 805).

Disciplined clock 100 retrieves available reference time differences (RTD1, RTD2, RTD3) from remote timing analyzer (step 806) and computes remote time differences (RemTD1, RemTD2, RemTD3) with respect to reference time differences (RTD1, RTD2, RTD3) from reference clock 104 via available common view signal (CVS1, CVS2, CVS3) from common view clock (102A, 102B, 102C) (step 807). Further, disciplined clock 100 determines if first common view signal CVS1 from first common view clock 102A is available (step 808). If first common view clock 102A is unavailable for an unacceptable interval, then data from a backup common view clock (e.g., 102B, 102C, or the like) is used to compute frequency correction 20 or a time correction (step 809), and local clock 10 is locked to reference clock 104 (step 810) via a link that involves a backup common view clock (102B, 102C, or the like). Lock is maintained by a continuous control loop that returns to step 801. If first common view clock 102A is available, controller 8 determines if first common view signal CVS1 is correct to within an acceptable tolerance by comparing first common view signal CVS1 with the common view signals (CVS2, CVS3) from backup common view clocks (102B, 102C) (step 811). If first common view signal CVS1 from first common view clock 102A is outside the acceptable tolerance, common view signal (CVS2, CVS3, or the like) from backup common view clock (102B, 102C, or the like) is used to compute frequency correction 20 or a time correction (step 812), and local clock 10 is locked to reference clock 100 for (step 813) via a link that involves a backup common view clock (102B, 102C, or the like). Lock is maintained by a continuous control loop that returns to step 801. If common view signal CVS1 from first common view clock 102A is within an acceptable tolerance, local clock 10 is locked to reference clock 104 (step 814) via a link that involves first common view clock 102A. Lock is maintained by a continuous control loop that returns to step 801.

Figure 17:
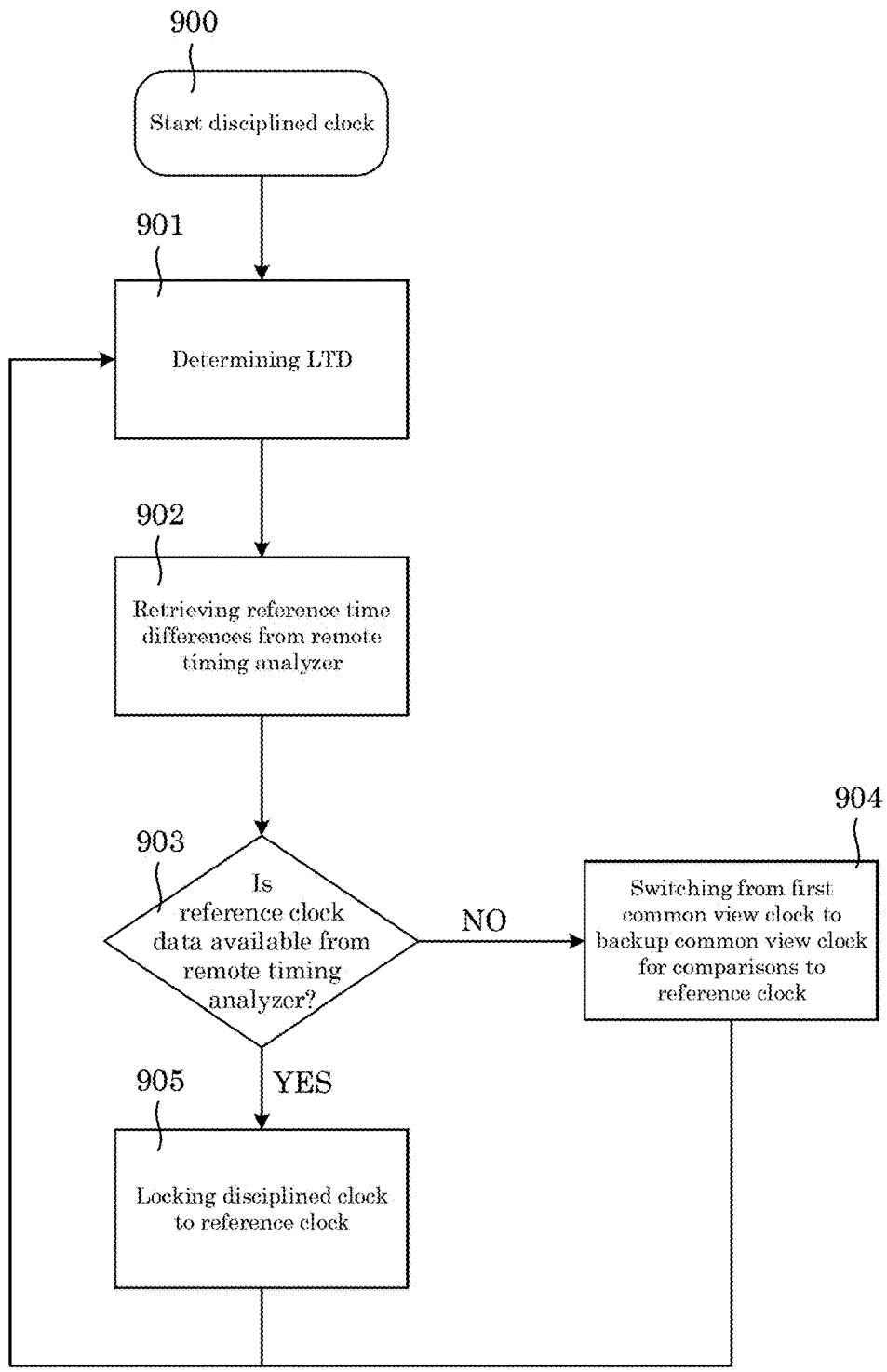
FIG. 17 shows a flow chart for producing a disciplined frequency and a disciplined time by a disciplined clock.

In an embodiment, when remote timing analyzer 106 is unavailable, e.g., due to a data network failure at disciplined clock 100 or a data network failure that affects reference clock 104, disciplined clock 100 may temporarily lose communication with reference clock 104. FIG. 17 shows a flowchart for operating disciplined clock 100 according to the flowchart shown in FIG. 14 when the data network has failed or remote timing analyzer 106 is unavailable. Here, disciplined clock 100 starts (step 900) and determines local time difference 18 (step 901). Thereafter, disciplined clock 100 retrieves available reference time differences 64 from remote timing analyzer 106 (e.g., a cloud server (step 902). Controller 8 determines whether retrieval of reference time differences 64 is successful (step 903). If retrieval of reference time differences 64 from remote timing analyzer 106 is unsuccessful, local time difference 18 is used to compute frequency correction 20 and time corrections and to lock local clock 10 to common view signal 108 (step 904). Thereafter, lock is maintained by a continuous control loop that returns to step 901. If retrieval of reference time differences 64 from remote timing analyzer 106 is successful, disciplined clock 100 is locked to reference clock 100 for (step 905), e.g., per the flowchart shown in FIG. 14.

The articles and processes herein are illustrated further by the following Example, which are non-limiting.

EXAMPLE

Figure 18:
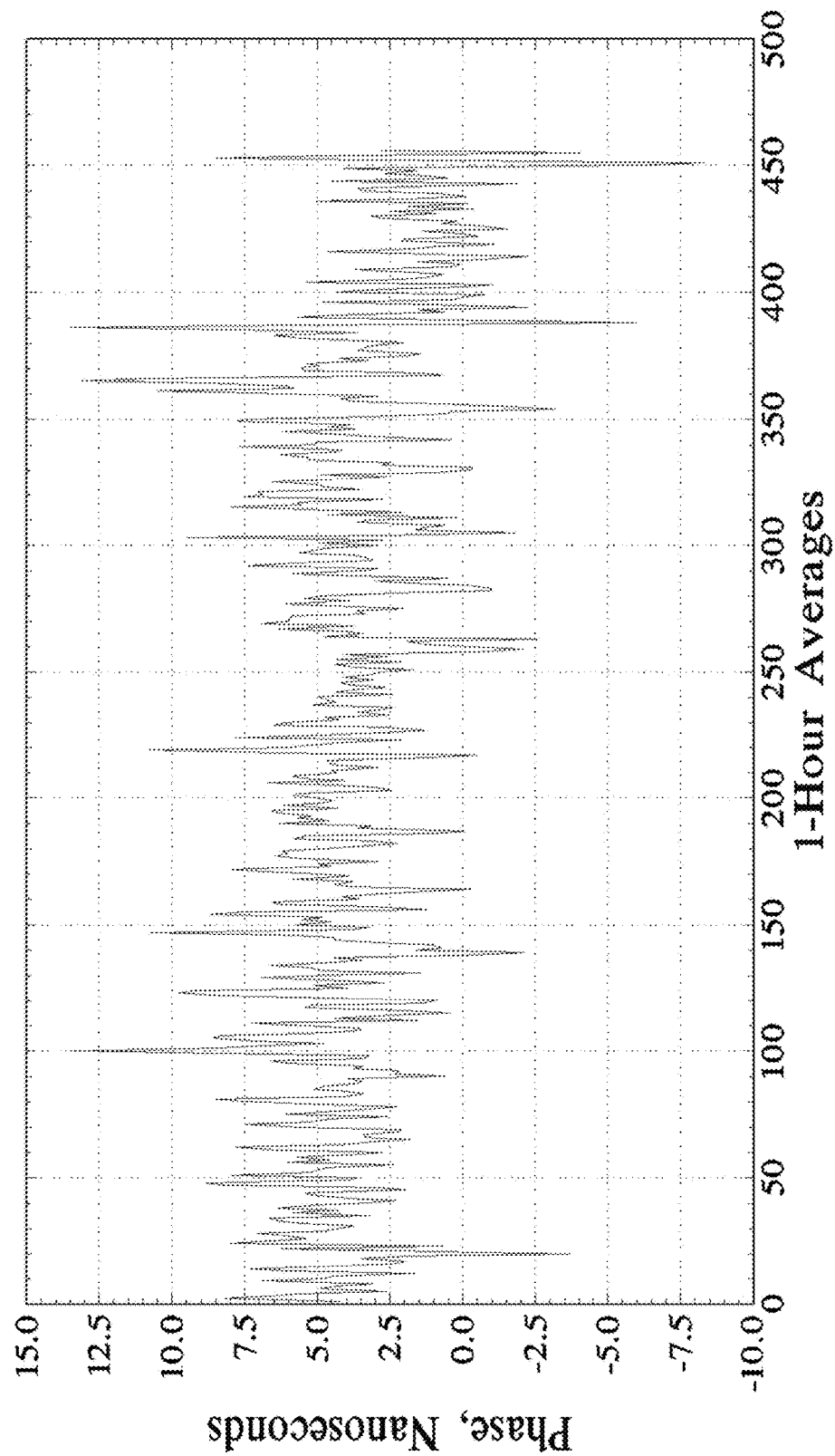
FIG. 18 shows a graph of phase versus 1-hour averages from producing a disciplined frequency and a disciplined time by a disciplined clock.

An exemplary disciplined clock was made and communicated with a reference clock and common view clock. FIG. 18 shows a graph of phase versus 1-hour averages from producing a disciplined frequency and a disciplined time by a disciplined clock.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A disciplined clock to provide a disciplined time and a disciplined frequency synchronous with a reference clock, the disciplined clock comprising:
    a time receiver to:
        receive a common view signal from the common view clock; and
        produce a receiver timing signal;
    a local clock to:
        receive a frequency correction; and
        produce a local timing signal;
    a time interval counter to:
        receive the receiver timing signal from the time receiver;
        receive the local timing signal from the lock clock; and
        determine a time difference between the receiver timing signal and the local timing signal; and
    a controller to:
        receive the time difference from the time interval counter; and
        communicate the frequency correction, based on the time difference, to the local clock.

2. The disciplined clock of claim 1, further comprising:
    a network interface to:
        communicate the time difference to a remote timing analyzer;
        receive the frequency correction from the remote timing analyzer; and
        communicate the frequency correction to the controller.

3. The disciplined clock of claim 1, wherein the controller determines the frequency correction based on the time difference.

4. The disciplined clock of claim 1, wherein the controller comprises a control loop feedback controller to control the local clock.

5. The disciplined clock of claim 4, wherein the control loop feedback controller comprises a proportional-integral-derivative controller.

6. The disciplined clock of claim 1, further comprising an antenna in electrical communication with the time receiver to:
  receive the common view signal from the common view clock; and
  communicate the common view signal to the time receiver.

7. The disciplined clock of claim 1, wherein the local clock comprises:
  an oscillator in electrical communication with the controller to:
    receive the frequency correction; and
    produce the disciplined frequency; and
  an internal clock in electrical communication with the time interval counter to:
    produce the local timing signal, based on the disciplined frequency from the oscillator;
    communicate the local timing signal to the time interval counter; and
    produce the disciplined time, based on the disciplined frequency from the oscillator.

8. The disciplined clock of claim 1, wherein time receiver receives the common view signal from a global navigation satellite system (GNSS) satellite when reception from the GNSS satellite is available.

9. The disciplined clock of claim 8, wherein the GNSS satellite comprises a global positioning system (GPS) satellite.

10. The disciplined clock of claim 9, wherein the time receiver receives the common view signal from a geostationary satellite when:
  reception from the GPS satellite is unavailable; and
  reception from the geostationary satellite is available.

11. The disciplined clock of claim 9, wherein the time receiver receives the common view signal from a terrestrial low frequency radio station when:
  reception from the GPS satellite is unavailable; and
  reception from the terrestrial low frequency radio station is available.

12. The disciplined clock of claim 2, wherein the remote timing analyzer comprises a data server available via public Internet.

13. The disciplined clock of claim 12, wherein the remote timing analyzer is in electrical communication with the reference clock;
  the reference clock provides a reference time difference to the remote timing analyzer; and
  the remote timing analyzer produces the frequency correction based on the reference time difference.

14. The disciplined clock of claim 9, wherein the reference time clock comprises a reference time scale and:
  receives the common view signal from the common view clock;
  produces the reference time difference as a difference between the reference time scale and a time derived from the common view signal; and
  communicates the reference time difference to the remote timing analyzer.

15. The disciplined clock of claim 14, wherein the reference time scale comprises:
  a primary source time, based on coordinated universal time (UTC); or
  a secondary source time, based on a national time scale or private time scale that are synchronized to UTC,
  wherein the reference time scale is the primary source time when the primary source time is available, and
  the reference time scale is the secondary source time when the primary source time is unavailable.

16. A process for producing a disciplined time and a disciplined frequency, the process comprising, by the disciplined clock of claim 1:
  receiving a common view signal from a common view clock;
  producing a first receiver timing signal from the common view signal;
  producing a local timing signal by the local clock;
  determining a local time difference between the local timing signal and the first receiver timing signal;
  communicating the local time difference to a remote timing analyzer;
  receiving a frequency correction by the controller from the remote timing analyzer, the frequency correction based on a remote time difference between the local time difference and reference time difference from a reference clock; and
  controlling the local clock by the controller such that the local clock produces the disciplined frequency and the disciplined time, based on the frequency correction.

17. The process for producing a disciplined time and a disciplined frequency of claim 16, further comprising, by the remote timing analyzer:
  receiving the local time difference from the disciplined clock and the reference time difference from the reference clock;
  determining the remote time difference from the local time difference and the reference time difference;
  determining the frequency correction from the remote time difference; and
  communicating the frequency correction to the disciplined clock.

18. The process for producing a disciplined time and a disciplined frequency of claim 17, further comprising, by the reference clock:
  receiving the common view signal;
  producing a second receiver timing signal from the common view signal;
  producing the reference timing signal from a reference time scale;
  determining the reference time difference from the reference timing signal and the second receiver timing signal; and
  communicating the reference time difference to the remote timing analyzer.

19. The process for producing a disciplined time and a disciplined frequency of claim 18, wherein the reference clock comprises a plurality of reference clocks, and the process further comprises:
  in an absence of reception from a first reference clock, switching the disciplined clock to use the remote time difference that is based on a second reference clock.

20. The process for producing a disciplined time and a disciplined frequency of claim 18, wherein the common view clock comprises a plurality of common view clocks, and the process further comprises:

in an absence of reception from a first common view clock, switching the disciplined clock to use the common view signal from a second common view clock.

21. The process for producing a disciplined time and a disciplined frequency of claim 18, further comprising, in an absence of reception of the common view signal by the disciplined clock:
communicating the remote time difference to the local clock from the remote timing analyzer;
receiving the remote time difference by the local clock from the remote timing analyzer; and
synchronizing the local clock to the reference clock, based on the remote time difference.

22. A process for producing a disciplined time and a disciplined frequency, the process comprising, by the disciplined clock of claim 1:
receiving a common view signal from a common view clock;
producing a first receiver timing signal from the common view signal;
producing a local timing signal by the local clock;
determining a local time difference between the local timing signal and the first receiver timing signal;
retrieving a reference time difference from a remote timing analyzer, the reference time difference based on a reference time scale from a reference clock;
determine a remote time difference from the local time difference and the reference time difference;
converting the remote time difference to a frequency correction; and
applying the frequency correction to the local clock such that the local clock produces the disciplined frequency and the disciplined time, based on the frequency correction.

23. The process for producing a disciplined time and a disciplined frequency of claim 22, further comprising, by the disciplined clock in an absence of reception of the common view signal:
applying the remote time difference the local clock to synchronize the local clock to the reference clock, prior to applying the frequency correction to the local clock.

24. The process for producing a disciplined time and a disciplined frequency of claim 22, further comprising, by the remote timing analyzer:
receiving the reference time difference from the reference clock; and
communicating the reference time difference to the disciplined clock.

25. The process for producing a disciplined time and a disciplined frequency of claim 24, further comprising, by the reference clock:
receiving the common view signal;
producing a second receiver timing signal from the common view signal;
producing the reference timing signal from a reference time scale;
determining the reference time difference from the reference timing signal and the second receiver timing signal; and
communicating the reference time difference to the remote timing analyzer.

26. The process for producing a disciplined time and a disciplined frequency of claim 22, wherein the reference clock comprises a plurality of reference clocks, and the process further comprises:
in an absence of reception from a first reference clock, switching the disciplined clock to use the reference time scale that is based on a second reference clock.

27. The process for producing a disciplined time and a disciplined frequency of claim 22, wherein the common view clock comprises a plurality of common view clocks, and the process further comprises:
in an absence of reception from a first common view clock, switching the disciplined clock to use the common view signal from a second common view clock.

* * * * *